United States Patent
Jessup

(10) Patent No.: US 12,005,852 B2
(45) Date of Patent: Jun. 11, 2024

(54) RESTRAINT SYSTEM INCLUDING A RESETTABLE WEB TENSIONING DEVICE

(71) Applicant: Indiana Mills & Manufacturing, Inc., Westfield, IN (US)

(72) Inventor: Chris P. Jessup, Sheridan, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 31 days.

(21) Appl. No.: 17/959,699

(22) Filed: Oct. 4, 2022

(65) Prior Publication Data

US 2023/0104082 A1 Apr. 6, 2023

Related U.S. Application Data

(60) Provisional application No. 63/252,205, filed on Oct. 5, 2021.

(51) Int. Cl.
*B60R 22/20* (2006.01)
*B60R 22/26* (2006.01)

(52) U.S. Cl.
CPC ............ *B60R 22/201* (2013.01); *B60R 22/26* (2013.01)

(58) Field of Classification Search
CPC ................. B60R 22/201; B60R 22/26; B60R 2022/208; B60R 2022/207; B60R 22/20; B60R 22/03; B60R 22/18; B60R 22/185; B60R 22/1855; B60R 2022/4808; B60R 2022/485; B60R 22/195
USPC ..................................................... 280/801.2
See application file for complete search history.

(56) References Cited

U.S. PATENT DOCUMENTS

| | | | | |
|---|---|---|---|---|
| 4,015,860 A | * | 4/1977 | Tisell | B60R 22/1951 297/480 |
| 6,481,777 B2 | * | 11/2002 | Mans | B60N 2/43 296/68.1 |
| 6,582,015 B2 | | 6/2003 | Jessup et al. | |
| 7,976,092 B2 | | 7/2011 | Meredith et al. | |
| 8,002,348 B2 | * | 8/2011 | Jessup | B60N 2/24 297/216.13 |
| 8,469,400 B2 | * | 6/2013 | Merrill | B60N 2/24 297/480 |
| 8,469,401 B2 | * | 6/2013 | Humbert | B60R 22/195 297/480 |
| 9,896,006 B2 | * | 2/2018 | Duncan | B60N 2/4279 |
| 2003/0182042 A1 | | 9/2003 | Watson et al. | |

(Continued)

*Primary Examiner* — Paul N Dickson
*Assistant Examiner* — Caitlin Anne Miller
(74) *Attorney, Agent, or Firm* — Barnes & Thornburg LLP

(57) ABSTRACT

An apparatus for tensioning an occupant restraint harness coupled to an occupant seat mountable in a motor vehicle, wherein the occupant restraint harness includes first and second lap webs securable about an occupant of the seat, may include a web tensioning device configured to be attached to a rear side of the occupant seat, the web tensioning device having an actuated state and an unactuated state, and a mechanical movement converter configured to be attached to the rear side of the occupant seat and having an input operatively coupled to the web tensioning device, a first output coupled to the first lap web and a second output coupled to the second lap web, the mechanical movement converter responsive to a transition of the web tensioning device from the unactuated state to the actuated state to simultaneously apply tension to the first and second lap webs.

19 Claims, 11 Drawing Sheets

(56) References Cited

U.S. PATENT DOCUMENTS

2004/0251675 A1\* 12/2004 Herberg .............. B60R 22/4604
                                                    280/806
2020/0254953 A1\* 8/2020 Jessup .................... B60R 22/26

\* cited by examiner

RESTRAINT SYSTEM INCLUDING A RESETTABLE WEB TENSIONING DEVICE

CROSS REFERENCE TO RELATED APPLICATION

This patent application claims the benefit of, and priority to, U.S. Provisional Patent Application Ser. No. 63/252,205, filed Oct. 5, 2021, the disclosure of which is incorporated herein by reference in its entirety.

FIELD OF THE INVENTION

The present disclosure relates generally to restraint systems for occupant seats in motor vehicles, and more specifically to such restraint systems including tensioning devices for tensioning one or more webs of the restraint system relative to the occupant seat under specified conditions.

BACKGROUND

Motor vehicle seat restraint systems typically include a multi-point restraint harness, made up of one or more restraint webs, coupled thereto. Some such restraint systems may further include a device or devices for tensioning the restraint harness, i.e., for tightening the restraint harness about the seat occupant, under certain operating conditions of the vehicle and/or other conditions.

SUMMARY

The present invention may comprise one or more of the features recited in the attached claims, and/or one or more of the following features and combinations thereof. In a first aspect, a device for tensioning an occupant restraint harness coupled to an occupant seat mountable in a motor vehicle may comprise an elongated housing configured to be secured to at least one of the occupant seat and a floor of the motor vehicle, a piston assembly axially movable within and along an elongated chamber defined within the elongated housing, one end of the piston assembly operatively coupled to the restraint harness, the piston assembly having an unactuated position within the elongated chamber at which the piston assembly does not tension the restraint harness and an actuated position within the elongated chamber at which the piston assembly tensions the restraint harness, and an actuator responsive to a first control signal to cause the piston assembly to move from the unactuated position to the actuated position to tension the occupant restraint harness, and responsive to a second control signal to reset the piston assembly from the actuated position to the unactuated position to release tension on the occupant restraint harness.

A second aspect may include the features of the first aspect, and wherein the piston assembly may include a piston having one end coupled to one end of a guide rod, and the guide rod may have an opposite end defining the one end of the piston assembly operatively coupled to the restraint harness.

A third aspect may include the features of the second aspect, and wherein the piston assembly may further include a biasing member coupled to and between an opposite end of the piston and a respective end of the elongated chamber, and wherein the biasing member may be configured to bias the piston assembly axially along the elongated chamber.

A fourth aspect may include the features of the third aspect, and wherein the biasing member may be configured to bias the piston assembly axially along the elongated chamber in a direction opposite the respective end of the elongated channel, and wherein the actuator may include a gas reservoir containing pressurized gas, and an electronically controllable valve having a gas inlet coupled to a gas outlet of the gas reservoir and a gas outlet in fluid communication with the elongated chamber, and wherein the valve may be responsive to the second control signal to selectively direct the pressurized gas in the gas reservoir into the elongated chamber to position the piston assembly in the unactuated position thereof by forcing the piston assembly to move axially within and along the elongated chamber, against the bias of the biasing member, to the unactuated position of the piston assembly within the elongated chamber.

A fifth aspect may include the features of the fourth aspect, and wherein the valve may further include a vent, and wherein, with the piston assembly in the unactuated position thereof within the elongated chamber, the valve may be responsive to the first control signal to direct pressurized gas in the elongated chamber through the vent to thereby allow the biasing member to move the piston assembly axially within and along the elongated chamber, under the bias of the biasing member, from the unactuated position of the piston assembly to the actuated position of the piston assembly within the elongated chamber.

A sixth aspect may include the features of the fourth aspect, and wherein, with the piston assembly in the actuated position thereof within the elongated chamber, the valve may be responsive to the second control signal to selectively direct the pressurized gas in the gas reservoir into the elongated chamber to reset the piston assembly in the unactuated position thereof by forcing the piston assembly to move axially within and along the elongated chamber, against the bias of the biasing member, from the actuated position of the piston assembly back to the unactuated position of the piston assembly within the elongated chamber.

A seventh aspect may include the features of the third aspect, and wherein the biasing member may be configured to bias the piston assembly axially along the elongated chamber in a direction toward the respective end of the elongated channel, and wherein the actuator may include a gas reservoir containing pressurized gas, and an electronically controllable valve having a gas inlet coupled to a gas outlet of the gas reservoir, a gas outlet in fluid communication with the elongated chamber and a vent, and wherein the valve may be responsive to the second control signal to selectively direct any pressurized gas in the elongated chamber through the vent to thereby allow the biasing member to move the piston assembly axially within and along the elongated chamber, under the bias of the biasing member, to the unactuated position of the piston assembly within the elongated chamber.

An eighth aspect may include the features of the seventh aspect, and wherein, with the piston assembly in the unactuated position thereof, the valve may be responsive to the first control signal to selectively direct the pressurized gas in the gas reservoir into the elongated chamber to force the piston assembly to move axially within and along the elongated chamber, against the bias of the biasing member, from the unactuated position of the piston assembly to the actuated position of the piston assembly within the elongated chamber.

A ninth aspect may include the features of the eighth aspect, and wherein, with the piston assembly in the actuated position thereof, the valve may be responsive to the second control signal to selectively direct the pressurized gas in the elongated chamber through the vent to reset the piston assembly in the unactuated position thereof by allowing the biasing member to move the piston assembly axially within and along the elongated chamber, under the bias of the biasing member, from the actuated position of the piston assembly back to the unactuated position of the piston assembly within the elongated chamber.

A tenth aspect may include the features of the second aspect, and wherein the piston assembly may further include a bracket fixedly mounted within the elongated chamber opposite an opposite end of the piston, and a first biasing member coupled to and between the opposite end of the piston and the bracket, the first biasing member configured to bias the piston assembly axially along the elongated chamber away from the bracket.

An eleventh aspect may include the features of the tenth aspect, and wherein the bracket may define at least one opening therethrough and the piston defines at least one channel therein, and wherein, in the unactuated position of the piston assembly within the elongated channel, the at least one opening defined through the bracket and the at least one channel defined in the piston may be aligned with one another, and wherein the device may further comprise at least one detent configured to pass into the at least one opening and into the at least one channel to secure the piston to the bracket in the unactuated position of the piston assembly within the elongated channel.

A twelfth aspect may include the features of the eleventh aspect, and wherein the actuator may include an electromagnet spaced apart from the bracket opposite the piston assembly, a ferromagnetic member positioned between the electromagnet and the bracket and axially movable therebetween and a second biasing member coupled to and between the electromagnet and the ferromagnetic member, and the second biasing member may be configured to bias the piston assembly axially along the elongated chamber away from the electromagnet.

A thirteenth aspect may include the features of the eleventh aspect, and wherein the electromagnet may be responsive to the second control signal to not produce a magnetic field such that the second biasing member forces the ferromagnetic member to move axially toward the bracket to trap the at least one detent in the at least one opening and the at least one channel to secure the piston to the bracket in the unactuated position of the piston assembly within the elongated channel.

A fourteenth aspect may include the features of the thirteenth aspect, and wherein the at least one detent may be biased radially away from the piston, and wherein, with the piston assembly in the unactuated position thereof, the electromagnet may be responsive to the first control signal to produce the magnetic field to draw the ferromagnetic member, against the bias of the second biasing member, toward the electromagnet and away from the bracket so as to clear the at least one detent such that the at least one detent moves, under bias, radially away from the piston to thereby allow the first biasing member to move the piston assembly axially within and along the elongated chamber, under the bias of the first biasing member, from the unactuated position of the piston assembly to the actuated position of the piston assembly within the elongated chamber.

In a fifteenth aspect, a device for tensioning an occupant restraint harness coupled to an occupant seat mountable in a motor vehicle may comprise an elongated housing configured to be secured to at least one of the occupant seat and a floor of the motor vehicle, a piston axially movable within and along an elongated chamber defined within the elongated housing, one end of the piston operatively coupled to the restraint harness, the piston having an unactuated position within the elongated chamber at which the piston does not tension the restraint harness and an actuated position with the elongated chamber at which the piston tensions the restraint harness, a biasing member coupled to and between an opposite end of the piston and a respective end of the elongated chamber, the biasing member configured to bias the piston assembly axially along the elongated chamber, and an actuator responsive to a first control signal to cause the piston to move from the unactuated position to the actuated position to tension the occupant restraint harness.

A sixteenth aspect may include the features of the fifteenth aspect, and wherein the biasing member may be configured to bias the piston toward one of the actuated position and the unactuated position.

A seventeenth aspect may include the features of the sixteenth aspect, and wherein the actuator may be responsive to a second control signal to reset the piston from the actuated position to the unactuated position to release the tension on the occupant restraint harness.

In an eighteenth aspect, a restraint system may comprise at least one sensor configured to produce at least one tensioning event signal in response to a detected restraint tensioning event, a device for tensioning an occupant restraint harness according to any of the first through seventeenth aspects, a control circuit, and a memory having instructions stored therein executable by the control circuit to cause the control circuit to be responsive to the at least one tensioning event signal to produce the first control signal.

A nineteenth aspect may include the features of the eighteenth aspect, and wherein the instructions stored in the memory may further include instructions executable by the control circuit to cause the control circuit to produce the second control signal upon lapse of a time period following production of the first control signal.

A twentieth aspect may include the features of the eighteenth aspect or the nineteenth aspect, and wherein the at least one sensor may include at least one sensor or at least one switch configured to produce at least one reset signal in response to a detected restraint reset event, and wherein the instructions stored in the memory may further include instructions executable by the control circuit to cause the control circuit to be responsive to the at least one reset signal to produce the second control signal.

In a twenty first aspect, an apparatus for tensioning an occupant restraint harness coupled to an occupant seat mountable in a motor vehicle, wherein the occupant restraint harness may include first and second lap webs securable about an occupant of the seat, may comprise a web tensioning device configured to be attached to a rear side of the occupant seat, the web tensioning device having an actuated state and an unactuated state, and a mechanical movement converter configured to be attached to the rear side of the occupant seat and having an input operatively coupled to the web tensioning device, a first output coupled to the first lap web and a second output coupled to the second lap web, the mechanical movement converter responsive to a transition of the web tensioning device from the unactuated state to the actuated state to simultaneously apply tension to the first and second lap webs.

DETAILED DESCRIPTION OF THE DRAWINGS

Figure 1:
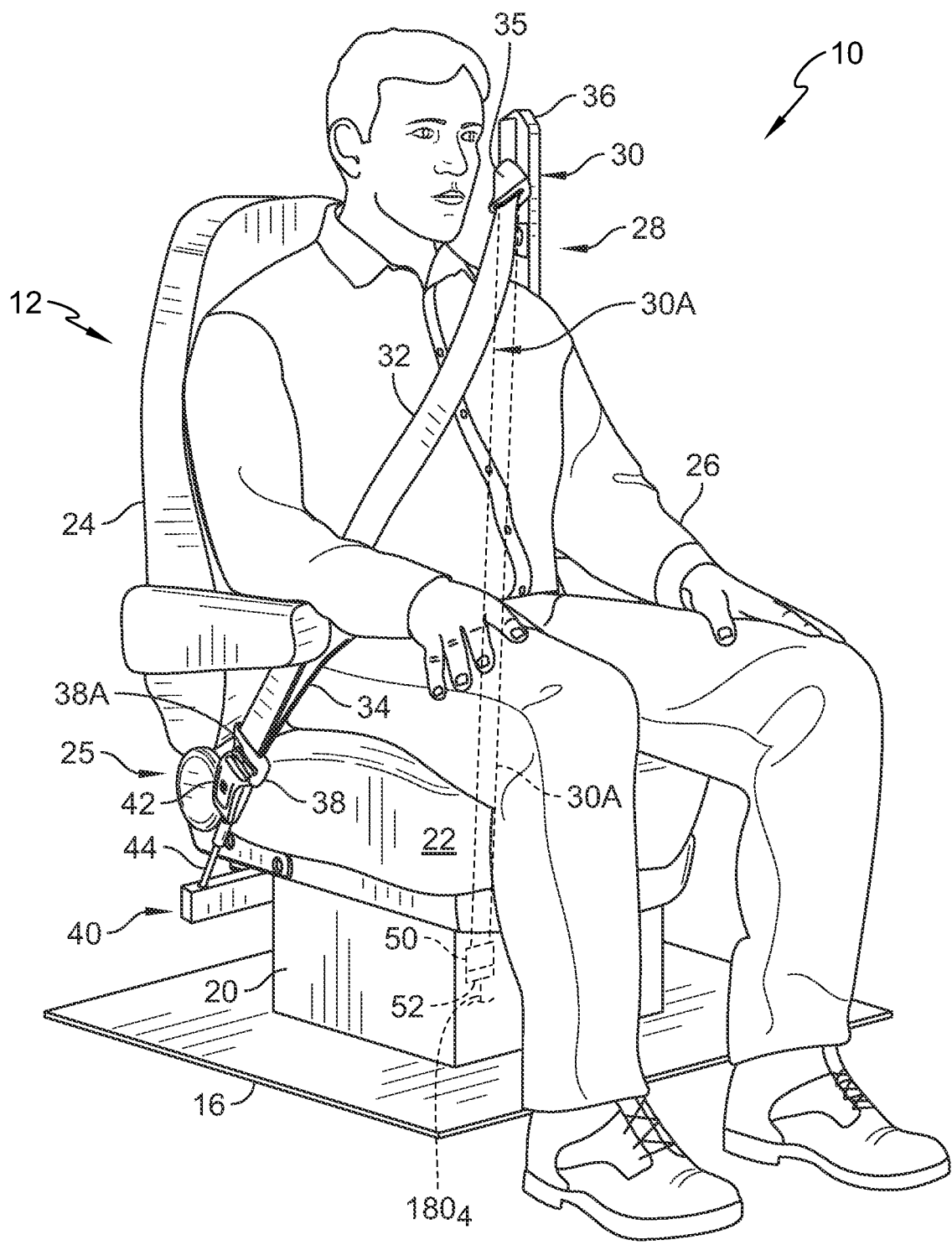
FIG. 1 is a front perspective view of an embodiment of an occupant seat restraint system including an occupant seat mounted in a motor vehicle, an embodiment of an occupant restraint system operatively coupled to the occupant seat and an embodiment of a restraint web tensioning device operatively coupled to the occupant restraint system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Referring now to FIG. 1, an embodiment is shown of a motor vehicle occupant seat restraint system 10 including an occupant seat 12 mounted to the floor 16 or other support surface of a motor vehicle. An occupant restraint system 28 is operatively coupled to the occupant seat 12, and includes an embodiment of a resettable restraint web tensioning device 40 mounted to the occupant seat 12. The device 40 is illustratively part of a control system operable to resettably tension one or more webs of the occupant restraint system 28 upon detection of one or more sensed and/or otherwise determined operating conditions of the motor vehicle and/or upon activation of at least one user-activated switch. In some embodiments, the occupant seat 12 may be a conventional motor vehicle occupant seat rigidly or adjustably, e.g., fore and aft, affixed to the floor 16 and/or frame component(s) of the motor vehicle. In alternate embodiments, the occupant seat 12 to which the tensioning device 40 is mounted may be pivotably attached to the floor 16 and/or frame component(s) of the motor vehicle. In still other alternate embodiments, the occupant seat 12 to which the tensioning device 40 is mounted may be a modular seat or seat back that may be removably or fixedly mounted in a motor vehicle. In any such embodiments, the device 40 is operable to resettably tension (or "pre-tension") one or more of the restraint webs of the occupant restraint system 28 upon detection of one or more sensed and/or otherwise determined operating conditions of the motor vehicle and/or upon activation of at least one user-activated switch. The motor vehicle in which the occupant seat 12 and the occupant restraint system 28 are to be mounted may be or include any land-based and/or water-based (e.g., any marine application) motor vehicle or any aircraft, without limitation, and/or may be or include any occupant transportation vehicle that is, or is configured to be, towed or pushed thereby. Examples of motor vehicles in which the occupant 12 seat may be mounted include, but are not limited to, an emergency vehicle, such as a fire fighting or rescue vehicle, medical vehicle, security vehicle or the like, a light, medium or heavy-duty truck, an industrial vehicle, e.g., construction and/or mining equipment, farm equipment, excavation equipment and/or other heavy equipment, a lift truck, a recreational vehicle such as an all-terrain vehicle (ATV), dune buggy or other off-road vehicle, an automobile, an electric vehicle, a utility vehicle (UTV), a commercial vehicle, a racing vehicle, a military vehicle, and the like.

In the embodiment illustrated in FIG. 1, the vehicle seat 12 illustratively includes a seat base 20 mounted to the floor 16 of a motor vehicle, a seat bottom 22 is mounted to the seat base 20 and a seat back 24 coupled to the seat bottom 22 and/or to the seat base 20 and extending upwardly and away from a rear end of the seat base 20 and seat bottom 22. In the illustrated embodiment, the seat bottom 22 and the seat back 24 together define an occupant support portion 25 of the occupant seat 12, and an occupant 26 is shown seated in, and supported by, the occupant support portion 25 of the occupant seat 12.

The restraint system 28 illustratively includes a multi-point occupant restraint harness 30. In the illustrated embodiment, the occupant restraint harness 30 is provided in the form of a conventional three-point restraint harness defined by a single web 30A having a torso-engaging portion 32 and a lap-engaging portion 34. One end of the web 30A illustratively extends through a web guide 35 and into engagement with a web retractor 50 mounted to the floor 16 of the motor vehicle or to the seat base 20. In some embodiments, the web retractor 50 may be a conventional web retractor, e.g., in the form of an automatic locking retractor (ALR) which automatically locks under one or more non-emergency conditions, or in the form of an emergency locking retractor (ELR) which locks under one or more emergency conditions. In some embodiments, the web retractor 50 may be a mechanically and/or electrically controlled and magnetically actuated locking web retractor of the type disclosed in U.S. patent application Ser. No. 17/002,016, filed Aug. 25, 2020, and in U.S. patent application Ser. No. 17/404,086, filed Aug. 17, 2021, the disclosures of which are both incorporated herein by reference in their entireties. In such embodiments, an actuator 52 is operatively coupled to the web retractor 50, and is electrically controllable to selectively lock the web retractor 50 to thereby selectively prevent the web retractor 50 from paying out the web 30A and to selectively unlock the web retractor 50 to thereby selectively allow the web retractor 50 to take up and pay out the web 30A. In embodiments which include the web retractor 50 with the actuator 52, the web retractor 50 may, along with the web tensioning device 40, be electronically controllable as will be described in detail below.

In the illustrated embodiment, the web guide 35 is mounted near the top end of a post or tower 36 having an opposite bottom end mounted to the floor 16 of the motor vehicle, and the web guide 35 is illustratively positioned relative to the post 36 so as to locate the web guide 35 at or above a shoulder of the seat occupant 26 that is proximate to the post 36 when the occupant 26 is seated in the vehicle seat 12. An opposite end of the web 30A is illustratively mounted, e.g., via a conventional web anchor (not shown), to the seat frame 18 on the side of the seat 12 that is adjacent to the post 36. Between the two ends, the web 30A extends through another web guide 38 which adjustably divides the web 30A into the torso-engaging portion 32, which extends across the torso of the occupant 26 between the web guides 35, 38, and the lap portion 34 which extends across the lap of the occupant 26 between the web guide 38 and the web anchor (not shown) attached to the seat frame 18 on the side of the seat 12 adjacent to the post 36.

The web guide 38 illustratively includes a conventional tongue member 38A that is configured to releasably engage a conventional buckle member 42 in a conventional manner. In alternate embodiments, the item 42 may represent a conventional tongue member, and the web guide 38 may include a conventional buckle member configured to releasably engage the tongue member 42. In any case, the buckle (or tongue) member 42 is illustratively coupled to one end of a linkage member 44 having an opposite end operatively coupled to the resettable restraint web tensioning device 40. The linkage member 44 may be or include one or more brackets, cables, tethers and/or other mechanical structure(s) operatively coupling the buckle (or tongue) member 42 to the resettable restraint web tensioning device 40. In some embodiments, the opposite end of the web 30A may be alternatively or additionally coupled, e.g. via a conventional web anchor, to the opposite end of the resettable restraint web tensioning device 40. In any case, the restraint web tensioning device 40 is mounted to the seat base 20 and/or to the seat bottom 22 adjacent to a bottom portion of the seat back 24, and/or is mounted to the bottom portion of the seat back 24, and/or is mounted to the floor 16 of the motor vehicle. It will be understood that the resettable web tensioning device 40 is depicted in FIG. 1 in simplified form, e.g., essentially in block diagram form, and that illustrative embodiments of the web tensioning device 40, 40' are illustrated in the attached figures and will described in detail below.

In the embodiment illustrated in FIG. 1, the restraint system 28 is provided in the form of a conventional three-point restraint system including a single web 30A partitioned by a web guide 38 into a torso-engaging portion 32 and a lap-engaging portion 34. It will be understood, however, that in alternative embodiments the restraint harness 28 may be any conventional multi-point restraint system having more or fewer webs and/or more or fewer points of restraint, i.e. more or fewer web attachment or anchorage points, and it will be understood that all such alternative restraint harnesses are intended to fall within the scope of this disclosure. As one example, in some embodiments the lap-engaging portion 34 may include two separate lap-engaging webs, and in some such embodiments the two separate lap-engaging webs may be integral with or coupled to two separate shoulder webs. In any such embodiments, each such lap-engaging web may be operatively coupled to the resettable restraint web tensioning device 40 such that the web-tensioning device 40 is operable to tension both lap-engaging webs simultaneously.

Referring now to FIGS. 2A-4B, an illustrative embodiment 100 is shown of the resettable restraint web tensioning device 40 illustrated in simplified form in FIG. 1. In the illustrated embodiment, the resettable restraint web tensioning device 100 includes an elongated housing 102, e.g., in the form of a cylindrical tube, although it will be understood that the housing 102 need not be cylindrical in shape but may take on other shapes. An elongated guide member 104, e.g., a guide rod, extends inwardly and axially into, and outwardly and axially away from, one end 102A of the housing, wherein the housing 102 has an opposite end 102B opposite the end 102A. An end of the guide member 104 extending from the housing 102 is coupled to one end of a connector 106 having an opposite end coupled to one end 108A of a locking arm 108 via a conventional fixation element 110. An opposite end 108B of the locking arm 108 is rotatably coupled to a lower end of a locking plate 112 via another conventional fixation element 114 such that the locking plate 112 is rotatable relative to the end 108B of the locking arm 108 about the fixation element 114.

The locking plate 112 is illustratively generally triangular in shape with sides 112A and 112B forming approximately a right angle relative to one another, and with the fixation element 114 rotatably coupling the plate 114 to the locking arm 108 approximately at or near the vertex of the approximate right angle defined by the two sides 112A, 112B. One end 44B of the linking member 44 is rotatably coupled to the plate 112 adjacent to the opposite end of the side 112A via another fixation element 116 such that the linking member 44 and the locking plate 112 are rotatable relative to one another about the fixation element 116. A free end 44A of the linking member 44 extends generally linearly away from the end 44B, and is configured to be coupled to the buckle (or tongue) member 42 of the occupant restraint system 28 illustrated by example in FIG. 1. In the embodiment illustrated in FIGS. 2A-2B and 3A-3B, the linking member 44 is provided in the form of a bracket, although in alternate embodiments the linking member 40 may take other forms, some non-limiting examples of which are described above. In the views illustrated in FIGS. 2A and 2B, the tensioning device 100 is in the unactuated or web non-tensioning state or position. In this position, the guide member 106 extends inwardly into the end 102A of the housing 102 which carries the locking arm 108 laterally toward the locking plate 112 as depicted by example in FIG. 2B.

The third side 112C of the generally triangular locking plate 112 defined between the opposite ends of the sides 112A, 112B is illustratively generally arcuate in shape with a lower portion of the side 112C adjacent to the opposite end of the side 112B and extending toward the opposite end of the side 112A defining a series of teeth 118 which extend upwardly along the side 112C to a step 120 which defines a stop as will be described in greater detail below. From the top of the step 120 to the opposite end of the side 112A of the plate 112, the side 112C defines a generally smooth arcuate portion 122 which defines a radius, relative to a rotational center point of the plate 112, that is greater than a radius defined by the arcuate shape of the toothed portion defining the series of teeth 118.

A bracket attachment member 126A is coupled to a free end of the actuation chamber 105, and a bracket member 123 is coupled to the bracket attachment member 126A and fixed thereto via a conventional fixation element 126B so as to fix the bracket member 123 to the housing 102. In one embodiment, the bracket attachment member 126A is provided in the form of a threaded member sized to receive an opening defined through the bracket member 123 and secured thereto via a complementarily threaded fixation member 126B, although it will be understood that other conventional bracket attachment member and fixation elements configurations may be used to fix the bracket member 123 to the free end of the actuation chamber 105.

Another bracket 124 defines a top section 124A and a leg section 124B which extends downwardly (e.g., vertically) away from the top section 124A. The leg section 124B is illustratively integral with the bracket member 123 such that the bracket member 123 and the leg section 124B are of unitary construction. In alternate embodiments, the bracket member 123 may be separate from the leg section 124B and fixed to the leg section 124B in any conventional manner. The bracket 124 illustratively further includes another leg section 124C laterally spaced apart from the leg section 124B and also extending downwardly (e.g., vertically) away from the top section 124A, and yet another leg section 124D which extends laterally away from a junction of the top section 124A with the leg section 124C. The leg section 124D illustratively terminates at a free end 124E thereof.

A plate engagement member 128 is illustratively mounted to the top section 124A of the bracket 124 generally opposite the free end of the leg section 124B. In the illustrated embodiment, the plate engagement member 128 is provided in the form of a plate defining a plate engagement tooth 128A extending downwardly away therefrom and toward the arcuate side 112C of the locking plate 112 and configured to engage the plate 112 between adjacent teeth 118 as will be described in detail below. In alternate embodiments, the plate engagement member 128 may defined two or more engagement teeth and/or other conventional engagement structure configured to engage the teeth 118 of the plate 112 or to engage the plate 112 between adjacent teeth 118 of the plate 112 as described below.

One end 130A of a biasing lever 130 is operatively coupled, via a biasing member B, to the free end 124E of the leg section 124D of the bracket 124. In the illustrated embodiment, the biasing member B is provided in the form of a coil spring configured to bias the end 130A of the biasing lever 130 toward the free end 124E of the leg section 124D of the bracket 124, although in alternate embodiments two or more such coil springs may be implemented and/or one or more other conventional biasing members may be operatively coupled between the end 130A of the biasing lever 130 and the free end 124E of the leg 124D of the bracket 124. An opposite end 130B of the biasing lever 130 is rotatably coupled to one side of the locking plate 112 via a conventional fixation element 132 which extends through a slotted opening 134 defined through the leg section 124B of the bracket 124 and through an opening 138 defined through the rotational center of the locking plate 112, such that the locking plate 112 is rotatable relative to the leg section 124B of the bracket 124 and also relative to the end 130B of the biasing lever 130. A middle section 130C of the biasing lever 130 is rotatably coupled to the free end of the leg section 124C of the bracket 124 via a conventional fixation element 136 such that the biasing lever 130 is rotatable relative to the free end of the leg section 124C of the bracket 124.

Figure 2A:
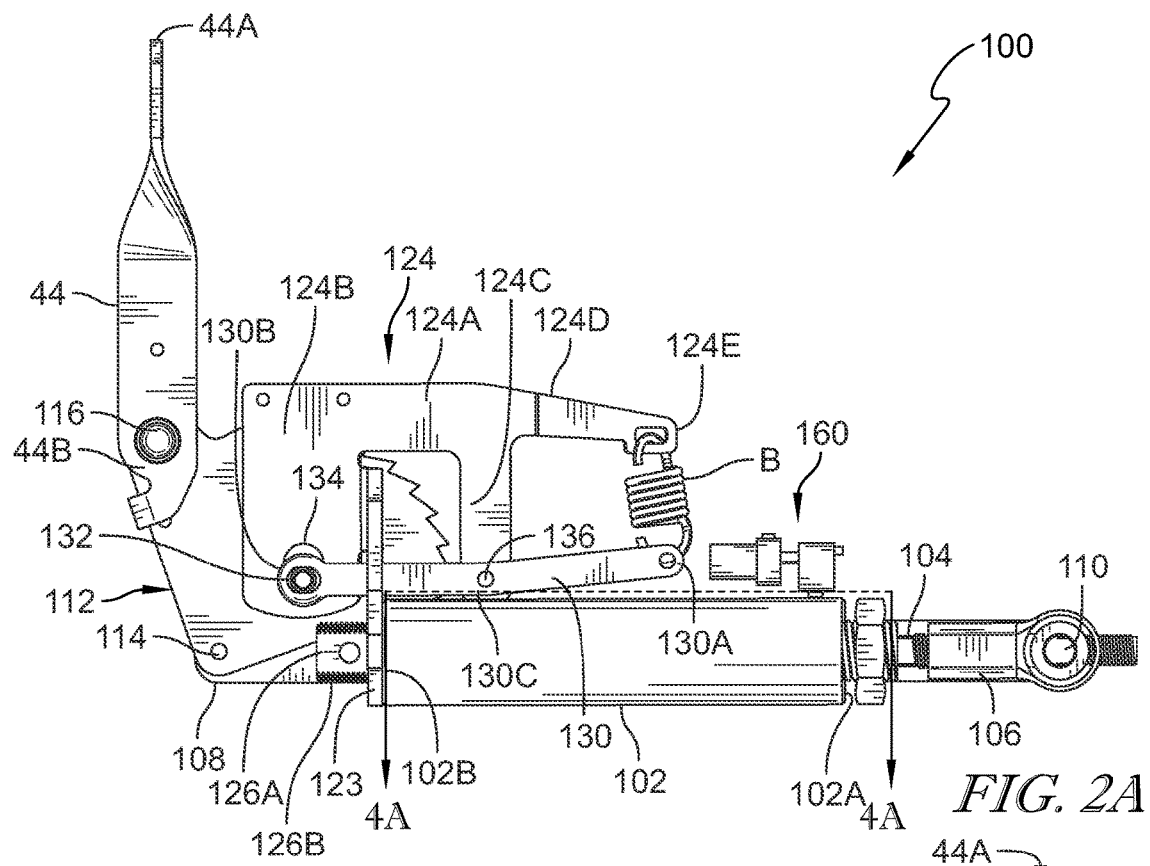
FIG. 2A is a front elevational view of an embodiment of the restraint web tensioning device illustrated in FIG. 1 shown in an unactuated or web non-tensioning state or position.
Figure 2B:
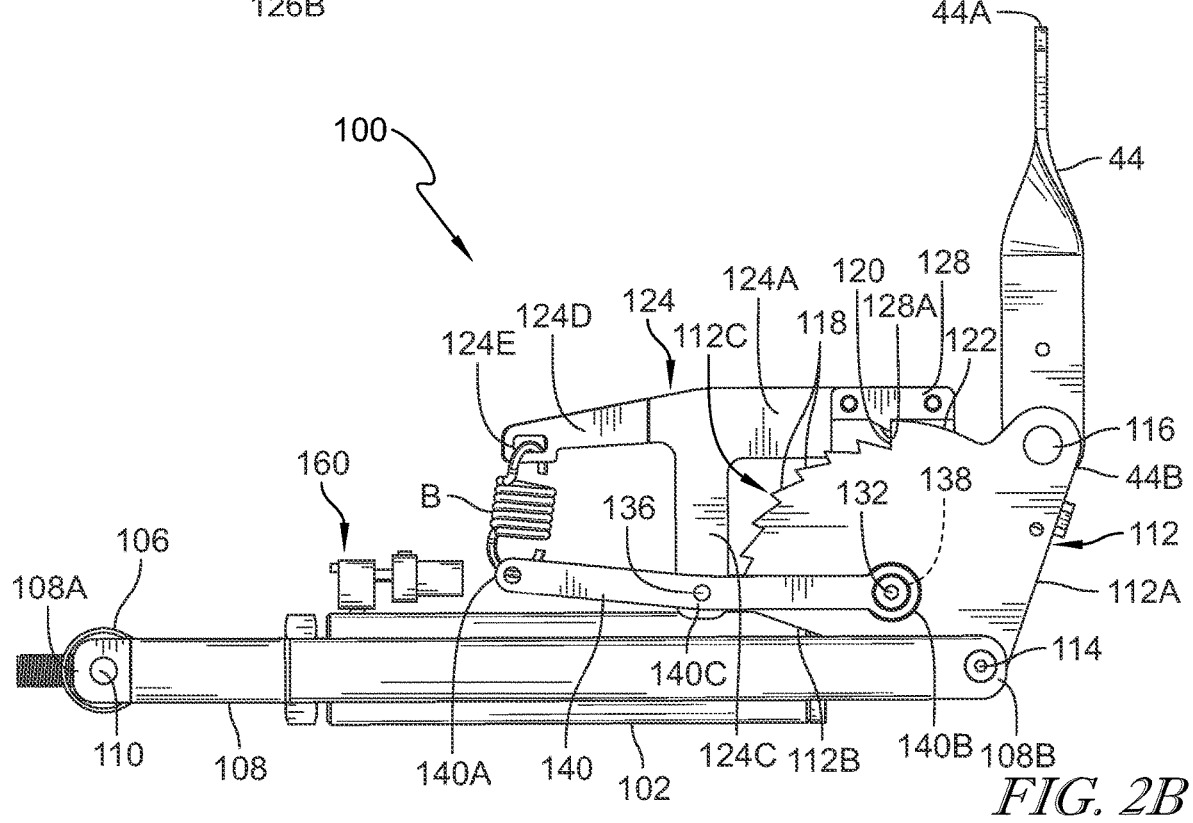
FIG. 2B is a rear elevational view of the restraint web tensioning device illustrated in FIG. 2A and also shown in the unactuated or web non-tensioning state or position.

One end 140A of another biasing lever 140 is operatively coupled, via the biasing member B, to the free end 124E of the leg section 124D of the bracket 124. An opposite end 140B of the biasing lever 140 is rotatably coupled to an opposite side of the locking plate 112 via the fixation element 132 extending through the opening 138 defined through the rotational center of the locking plate 112, such that the locking plate 112 is rotatable relative to the end 140B of the biasing lever 140. In the illustrated embodiment, it will be understood that the bracket 124 includes another leg section, identical to the leg section 124B which extends downwardly from the top section 124A on the opposite side of the plate engagement member 128 and juxtaposed with the leg section 124B, which is omitted in FIGS. 2B and 3B so as to exposed details of the arcuate side 112C of the locking plate 112 of the plate engagement member 128. The leg section omitted from FIGS. 2B and 3B illustratively defines a slotted opening therethrough identical to the slotted opening 134 defined though the leg section 124B, and the fixation element 132 illustratively extends through such an opening defined through the omitted leg section of the bracket 124 and through the opening 138 defined through the rotational center of the locking plate 112, such that the locking plate 112 is rotatable relative to the omitted leg section of the bracket 124 and also relative to the end 140B of the biasing lever 140. Illustratively, the slotted openings 134 are oriented such that the slotted openings are elongated vertically relative to the locking plate 112 and the bracket 124 as illustrated by example in FIGS. 2A and 3A. A middle section 140C of the biasing lever 130 is rotatably coupled to the free end of the leg section 124C of the bracket 124 via the fixation element 136 such that the biasing lever 140 is rotatable relative to the free end of the leg section 124C of the bracket 124.

The biasing levers 130, 140 are illustratively configured in a generally arcuate shape about the middle sections 130C, 140C such that the middle sections 130C, 140C are positioned vertically lower relative to the top line of the bracket 124 than are the two ends 130A, 130B and 140A, 140B. In the unactuated (i.e., non-tensioning) state or position of the tensioning device 100 illustrated by example in FIGS. 2A and 2B, the biasing member B acts on the ends 130A, 140A of the biasing levers 130, 140 to bias the ends 130A, 140A upwardly toward the free end 124E of the leg section 124D of the bracket 124, as illustrated by example in FIGS. 2A and 2B. This causes the biasing levers 130, 140 to rotate or pivot (generally counterclockwise in the view illustrated in FIG. 2A and clockwise in the view illustrated in FIG. 2B) about the middle sections 130C, 140C, e.g., about the fixation element 136, which draws the ends 130B, 140B of the biasing levers 130, 140 downwardly to and against the bottom edge or wall of the slot openings 134 defined through the bracket 124. As the ends 130B, 140B of the biasing levers 130, 140 are rotatably coupled to the locking plate 112, this pivoting of the biasing levers 130, 140, in turn, draws the locking plate 112 downwardly away from the top section 124A of the bracket 124 and thus draws the arcuate side 112C of the locking plate 112 downwardly away from the plate engagement member 128. In the unactuated (i.e., non-tensioning) state or position of the tensioning device 100 illustrated in FIGS. 2A and 2B, the plate engagement tooth 128A is illustratively configured and oriented so as to engage the step 120 defined in the actuate side 112C of the locking plate 112 to prevent the locking plate 112 from rotating further clockwise in the view illustrated in FIG. 2A or further counterclockwise in the view illustrated in FIG. 2B. In this position of the locking plate 112, the lower end 44B of the linking member 44 is positioned adjacent to the top section 124A of the bracket 124 such that, in the unactuated (i.e., non-tensioning) state or position of the tensioning device 100 illustrated in FIGS. 2A and 2B, the linking member 44 is positioned by the locking plate 112 in the highest vertical position of the linking member 44 relative to the bracket 124 and thus relative to the device 100.

Figure 3A:
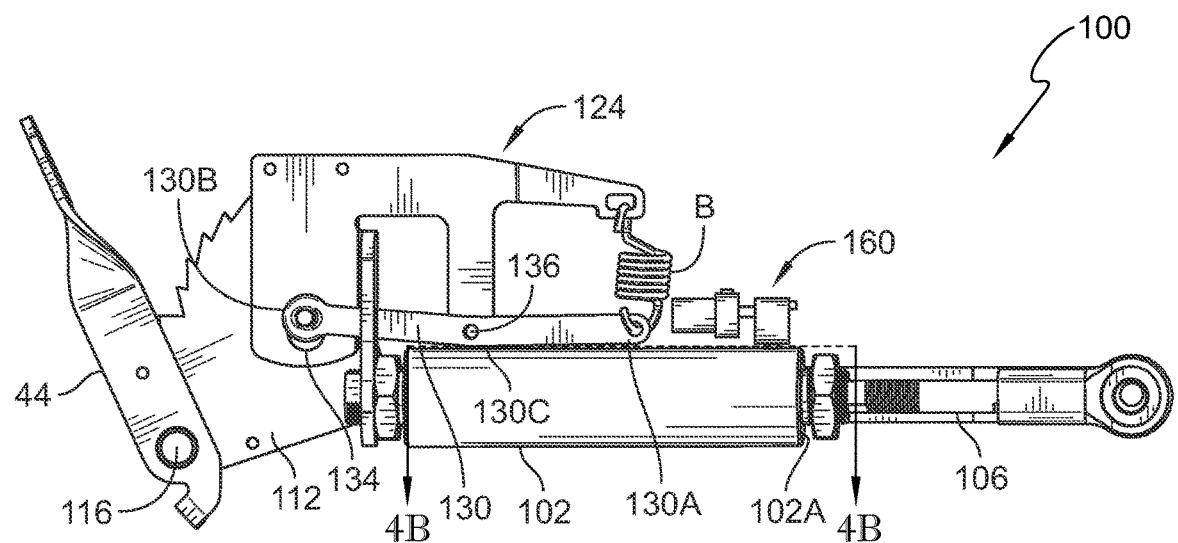
FIG. 3A is a front elevational view of the restraint web tensioning device illustrated in FIGS. 2A and 2B and shown in an actuated or web tensioning state or position.
Figure 3B:
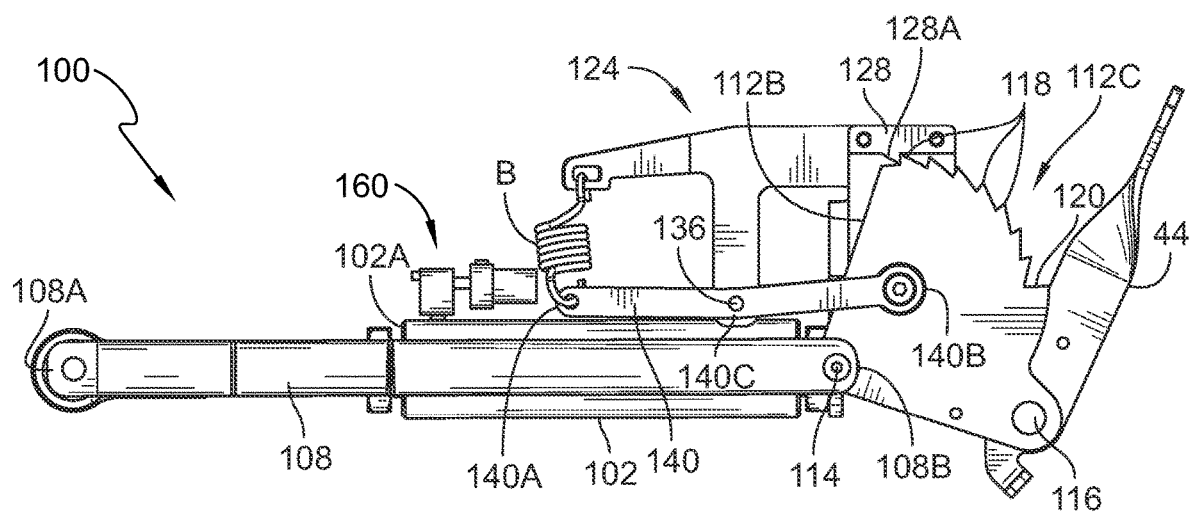
FIG. 3B is a rear elevational view of the restraint web tensioning device illustrated in FIG. 3A and also shown in the actuated or web tensioning state or position.

In the views illustrated in FIGS. 3A and 3B, the tensioning device 100 is in the actuated or web tensioning state or position. In this position, the guide member 106 is extended outwardly away from the end 102A of the housing 102 which carries the locking arm 108 laterally away from the locking plate 112 as depicted by example in FIG. 3B. As the end 108B of the locking arm 108 is rotatably coupled to the locking plate 112, this movement of the locking arm 108 causes the locking plate 112 to rotate relative to the end 108B of the locking arm 108 about the fixation element 114, i.e., in the counterclockwise direction in the view illustrated in FIG. 3A and in the clockwise direction illustrated in FIG. 3B. The force applied by the biasing arm 108 on the locking plate 112 as the biasing arm 108 is displaced laterally by the guide member 106 is greater than the biasing force applied by the biasing member B to the ends 130A, 140A, and the concomitant rotation of the locking plate 112 drives the ends 130A, 140A of the biasing levers 130, 140, against the bias of the biasing member B, upwardly into the slot openings 134 defined through the leg(s) 124B of the bracket 124 which, in turn, moves the arcuate side 112C of the locking plate 112 upwardly toward and into engagement with the plate engagement member 128. The teeth 118 defined on and partially along the arcuate side 112C of the locking plate 112 are oriented such that the tips of the teeth 118 are angled generally downwardly toward the opposite end of the side 112B of the plate 112, and such that the top surfaces of the teeth 118 between the tips and plate 112 ride against and along the plate engagement tooth 128A as the locking plate 112 rotates (in the counterclockwise direction in the view illustrated in FIG. 3A and in the clockwise direction in the view illustrated in FIG. 3B) under the force applied by the laterally displaced biasing arm 108. At the end of the lateral displacement of the biasing arm 108, the locking plate 112 is prevented from rotating back toward the unactuated position of the device 100 by the tooth 128A engaging with the side 112C of the locking plate 112 between two adjacent teeth 118 as depicted by example in FIG. 3B. The tooth 128A of the plate engagement member 128 engaging with the teeth 118 of the locking plate 112 maintains the web tensioning device 100 in the actuated (i.e., web tensioning) state or position until the web tensioning device 100 is reset to the unactuated position (depicted by example in FIGS. 2A and 2B), as will be described in detail below. In this position of the locking plate 112, the lower end 44B of the linking member 44 is rotated downwardly away from the bracket 124 such that, in the actuated or web tensioning state or position of the tensioning device 100 illustrated in FIGS. 3A and 3B, the linking member 44 is positioned by the locking plate 112 in the lowest vertical position of the linking member 44 relative to the bracket 124 and thus relative to the device 100 so as to apply tension to the web harness 30.

Figure 4A:
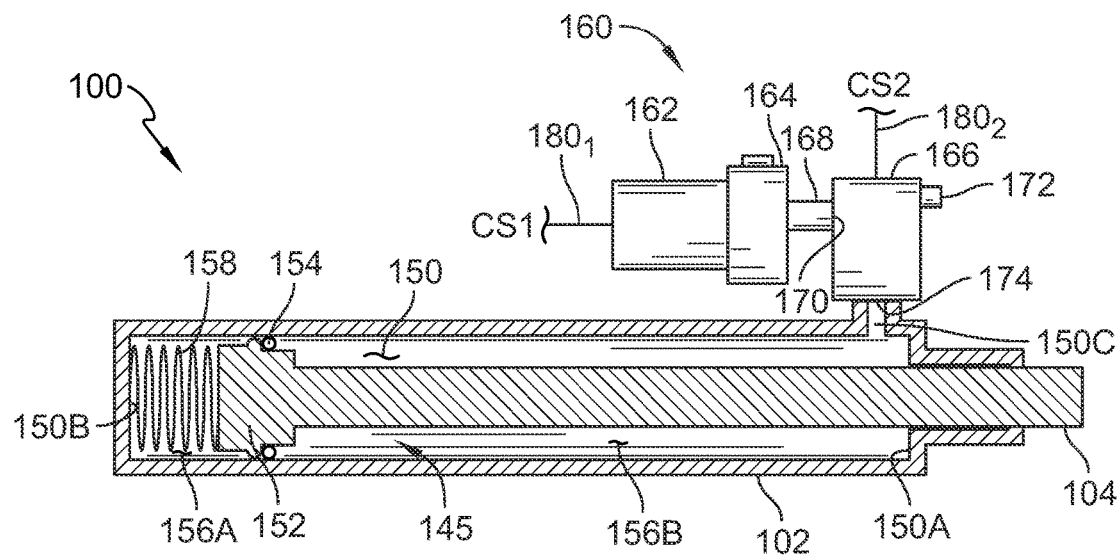
FIG. 4A is a cross-sectional view of the housing of the restraint web tensioning device of FIGS. 2A-3B as viewed along section lines 4A-4A of FIG. 2A and illustrating the piston assembly contained therein in the unactuated or web non-tensioning state or position of the device.
Figure 4B:
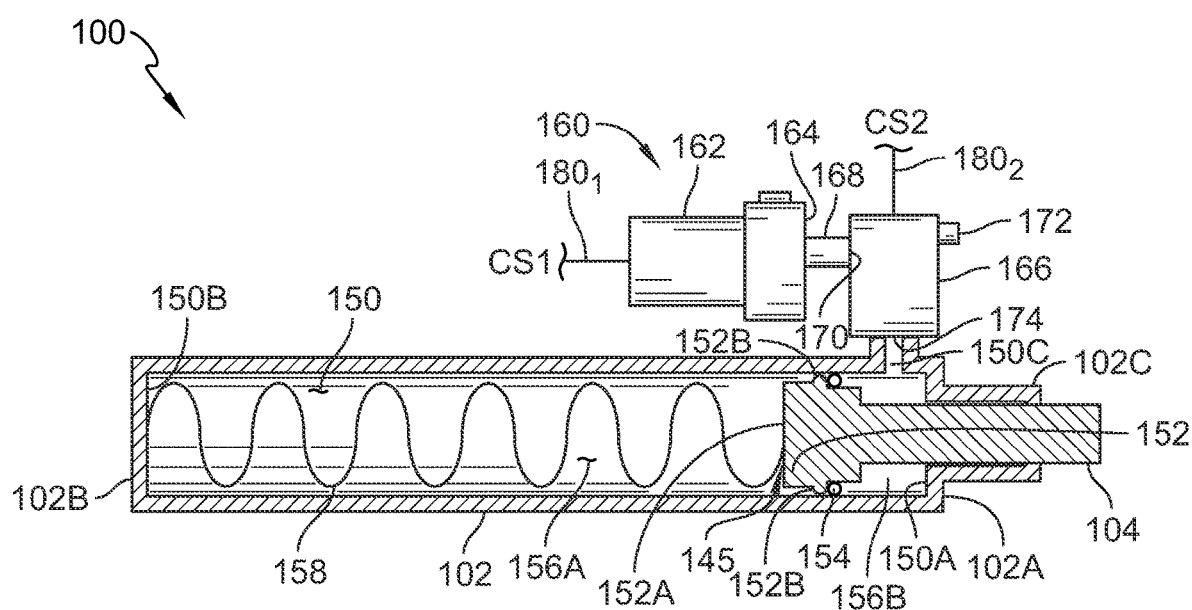
FIG. 4B is a cross-sectional view of the housing of the restraint web tensioning device of FIGS. 2A-3B as viewed along section lines 4B-4B of FIG. 3A and illustrating the piston assembly contained therein in the actuated or web tensioning state or position of the device.

In the embodiment illustrated in FIGS. 2A-3B, the web tensioning device 100 includes an electronically-controlled actuator assembly 160 operatively coupled to the housing 102. In this embodiment, the actuator assembly 160 is configured to actuate a piston assembly 145 carried by the housing 102 of the device 100 from the unactuated position illustrated in FIGS. 2A and 2B to the actuated position illustrated in FIGS. 3A and 3B, and to reset the device 100 from the actuated position illustrated in FIGS. 3A and 3B to the unactuated position illustrated in FIGS. 2A and 2B. Referring now to FIGS. 4A and 4B, an embodiment of the electronically-controlled actuator assembly 160 and of the piston assembly 145 and associated housing 102 is shown. In the illustrated embodiment, the housing 102 defines an elongated chamber 150 therein which extends between one end 150A of the chamber 150 bounded by the end 102A of the housing 102 and an opposite end 150B of the chamber 150 bounded by a closed end of the actuation chamber 105. The piston assembly 145 illustratively includes a piston 152 coupled to or otherwise defined by the end of the guide member 104 which extends into the chamber 150 defined by the housing 102, and a biasing member 158 coupled to and between a terminal end 152A of the piston 152 and the end 150B of the chamber 150. In the illustrated embodiment, the biasing member 158 is implemented in the form of a coil spring configured to bias the piston 152 (and the guide member 104 coupled thereto) away from the end 150B of the chamber 150 toward the opposite end 150A of the chamber 150, although in alternate embodiments the biasing member 158 may alternatively or additionally include one or more additional coil springs and/or one or more other conventional biasing members.

The piston 152 includes a protrusion 152B extending circumferentially thereabout, and a sealing member 154, e.g., a flexible O-ring or other suitable sealing member, is disposed about the piston 152 adjacent to the protrusion 152B such that the seal 154 divides the chamber 150 between variable-volume, opposed chamber sections 156A, 156B on opposite sides of the piston 152 as the piston 152 (and the guide member 104 driven thereby) move longitudinally along and through the chamber 150. The guide member 104 forms a seal with and against an end portion 102C of the housing 102 such that the chamber sections 156A and 156B are sealed and airtight relative to one another.

The electronically-controlled actuator assembly 160 illustratively includes a conventional, electronically-controlled pump 162 configured to be electrically connected to a control circuit via a signal path $180_1$ so as to receive control signals CS1 from the control circuit for controlling operation of the pump 162. In the illustrated embodiment, the pump 162 is illustratively implemented in the form of a conventional compressor with an integral motor which is controllable to pump gas, e.g., air, into a storage receptacle or container 164 and to maintain the gas therein at a predetermined or selectable pressure. In alternate embodiments, the pump 162 may be or include any conventional pump and an associated storage receptacle or container 164 which is operable to pump the gas into the storage receptacle and to maintain the gas therein at a predetermined or selectable pressure. In some embodiments, the pump 162 and/or the storage receptacle includes at least one pressure sensor configured to produce a pressure signal indicative of gas pressure within the receptacle or container 164. In some such embodiments, an off-board control circuit (e.g., see FIG. 9 for an example embodiment) is configured to monitor the pressure signal and control the pump 162 to selectively establish and/or maintain the gas pressure in the receptacle 164 at a predefined or selectable pressure or within a predefined or selectable pressure range. In some alternate embodiments, the pump 162 may include one or more electrical control components configured to monitor the pressure signal and control the pump 162 to maintain the gas pressure in the receptacle or container 164 at a predefined or selectable pressure or within a predefined or selectable pressure range.

A gas outlet of the gas storage receptacle 164 is operatively coupled to a gas inlet 170 of a conventional, electronically-controllable valve 166. In the illustrated embodiment, the gas inlet of the control valve 166 is coupled to the gas outlet of the storage receptacle 164 via a conventional check valve 168. The check valve 168, in embodiments which include it, is operable to prevent backflow of gas from the valve 168 into the storage receptacle 164. In alternate embodiments, the check valve 168 or other component with similar functionality, may be integral with the storage receptacle 164.

The control valve 166 illustratively includes a gas outlet port or vent 172 via which the control valve 166 can selectively vent gas within the valve 166 to ambient, i.e., to the atmosphere surrounding the device 100. A gas outlet 174 of the control valve 166 is fluidly coupled to a gas inlet 150C of the housing 102, wherein the gas inlet 150C is fluidly coupled to the chamber section 156B. The control valve 166 is configured to be electrically connected to a control circuit via a signal path $180_2$ so as to receive control signals CS2 from the control circuit for controlling operation of the control valve 166. Illustratively, the control valve 166 has three control states which may be selected by different corresponding control signals CS2: (1) an OFF state in which the gas inlet 170 is closed to prevent pressurized gas in the storage receptacle or container 164 from entering the valve 166, and in which the vent 172 is also closed to prevent venting of gas in the valve 166 and/or in the chamber section 156B to ambient, such that pressurized gas, if any, is maintained within the chamber section 156B of the housing 102, (2) an ON state in which the gas inlet 170 is open to allow pressurized gas in the storage receptacle or container 164 to enter the valve 166, and in which the vent 172 is closed to prevent venting of gas in the valve 166 and/or in the chamber section 156B to ambient, such that the valve 166 directs pressurized gas from the storage receptacle or container 164 into the chamber section 156B via the gas inlet 150C of the housing 102, and (3) a VENT state in which the gas inlet 170 is closed to prevent pressurized gas in the storage receptacle or container 164 from entering the valve 166, and in which the vent 172 is open to vent gas in the valve 166 and/or gas in the chamber section 156B to ambient.

FIGS. 2A, 2B and FIG. 4A illustratively represent the unactuated state of the web tensioning device 100 in which the device 100 is not applying any active tensioning force to the web(s) 30A via the combination(s) of the linking member(s) 44 and the buckle(s) 42. In the unactuated state, the pressure in the chamber section 156B has previously been increased by opening the control valve 66 to the ON position such that the control valve 66 directs pressurized gas from the gas receptacle or container 164 into the chamber section 156B of the housing 102. The pressure of the gas entering the chamber section 156B and acting on the piston 152 is illustratively greater than that which overcomes the biasing force of the biasing member 158 so as to move the piston assembly 145 into the chamber section 156A and to the unactuated position illustrated by example in FIG. 4A. Thereafter, the control valve 66 is controlled to the OFF state to maintain the piston assembly 145 in the position illustrated in FIG. 4A. In some embodiments, the valve 166 and/or the chamber 102 is equipped with a pressure sensor via which a control circuit (e.g., see FIG. 9) can monitor the pressure in the chamber section 156B and selectively control the valve 166, in the event of pressure loss in the chamber section 156B, to keep the pressure within the chamber section 156B at a pressure level which maintains the piston assembly 145 in the position illustrated in FIG. 4A.

In the unactuated state, the pressure within the chamber section 156B of the chamber, acting against the biasing force of the biasing member 158, thus positions the piston assembly 145 such that the guide member 104 is completely retracted within the housing 102 as illustrated by example in FIG. 4A. In this position, the guide member 104 positions the locking arm 108 to maintain the locking plate 112 in the fully unlocked position illustrated by example in FIGS. 2A, and 2B in which the biasing member B biases the levers 130, 140 to maintain the ends 130B, 140B of the levers 130, 140 against the bottom ends of the slots 134 which, in turn, maintains the arcuate side 112C of the locking plate 112 spaced apart from the plate engagement member 128 such that the tooth 128A of the plate engagement member 128 engages the step 120 as illustrated by example in FIG. 2B.

In the unactuated state of the device 100, the locking plate 112 positions the fixation element 116 in its most upright, vertical position in which the linking member 44 is rotated, or is rotatable, to its most upright, vertical position as illustrated by example in FIGS. 2A and 2B, such that the device 100 does not apply tension to the restraint harness 30.

Upon actuation of the device 100 from the unactuated state, via switching of the control signals CS2 to the VENT state, the control valve 66 directs pressurized gas from the chamber section 156B of the housing 102 into the valve 66 and then to ambient through the vent 172. As the pressure within the chamber section 156B of the housing 102 decreases below that which maintains the piston assembly 145 in the position illustrated in FIG. 4A, the biasing force of the biasing member 158 acting on the piston assembly 145 in the opposite direction moves the piston assembly 145 into the chamber section 156B and to the actuated position illustrated by example in FIG. 4B. Illustratively, the biasing force of the biasing member 158 and the rate of pressure decrease in the chamber section 156B resulting from opening of the vent 172 are selected so as to cause the piston assembly 145 to rapidly move, e.g., within a selected actuation time period such as, but not limited to less than 1 second or, in some embodiments, in the range of milliseconds, from the unactuated position illustrated by example in FIG. 4A to the actuated position illustrated by example in FIG. 4B.

As the piston assembly 145 moves from the unactuated position illustrated in FIG. 4A to the actuated position illustrated in FIG. 4B, the guide member 104 begins to axially extend out of the housing 102 which, in turn, begins to move the locking arm 108 toward the locking plate 112. As the locking arm 108 begins to rotate the locking plate 112 toward the locked position (i.e., counterclockwise in FIGS. 2A and 3A and clockwise in FIGS. 2B and 3B), the force applied by the end 108B of the locking arm 108 on the locking plate 112 acts on the ends 130B, 140B of the biasing levers 130, 140 with an upward force that is greater than the upward force applied to the opposite ends 130A, 140A of the biasing levers 130, 140 by the biasing member B. As a result, the force applied by the end 108B of the locking arm 108 on the locking plate 112 forces the ends 130B, 140B of the biasing levers 130, 140 into and against the upper end or wall of the slot(s) 134, thereby displacing the locking plate 112 upwardly and forcing the arcuate side 112C of the locking plate 112 against the tooth 128A of the plate engagement member 128. As the plate 112 continues to rotate under the force applied by the moving piston assembly 145 to the locking arm 108, the tooth 128A of the plate engagement member 128 rides on the top surfaces of the series of teeth 118 defined on the arcuate side 112C of the locking plate 112 between the step 120 and a respective end of the side 112B of the locking plate 112. As the piston assembly 145 reaches the end of travel at the actuated position illustrated by example in FIG. 4B, the locking plate 112 ceases rotation and the tooth 128A of the plate engagement member 128 engages the arcuate side 112C of the locking plate 112 between two adjacent teeth 118 as illustrated by example in FIG. 3B. It will be understood that while FIG. 3B shows the tooth 128A engaged with the arcuate side 112C of the locking plate 112 at the last tooth in the series of teeth 118, the device 100 may in alternate embodiments be configured such that the tooth 128A engages between others of the teeth 118 in the actuated state of the device 100. In any case, such engagement of the tooth 128A with the arcuate side 112C of the locking plate 112 acts to lock the device 100 in the actuated position so that the device 100 need not rely alone on the biasing force of the biasing member 158 to maintain the device 100 in the actuated position. In the transition of the device from the unactuated position of the device 100 illustrated in FIGS. 2A and 2B to the actuated position of the device 100 illustrated in FIGS. 3A and 3B, the locking plate 112 moves the fixation element 116 from its highest vertical position to its lowest vertical position to apply a downward force, via the linking member 44, to the buckle(s) 42 to thereby apply tension to the web(s) 30A of the restraint harness 30.

In the embodiment illustrated in FIGS. 2A-4B, the device 100 is illustratively resettable, via electronic control of the actuator assembly 160, from the actuated state or position illustrated in FIGS. 3A and 3B to the unactuated state or position illustrated in FIGS. 2A and 2B. The device 100 is reset via switching of the control signals CS2 from the VENT state to the ON state so that the control valve 66 directs pressurized gas from the gas receptacle or container 164 into the chamber section 156B of the housing 102. The pressure of the gas entering the chamber section 156B and acting on the piston 152 is illustratively greater than that which overcomes the biasing force of the biasing member 158 so as to move the piston assembly 145 into the chamber section 156A from the actuated position illustrated by example in FIG. 4B to the unactuated position illustrated by example in FIG. 4A.

As the piston assembly 145 moves from the actuated position illustrated in FIG. 4B toward the unactuated position illustrated in FIG. 4A, the guide member 104 begins to axially extend into the housing 102 which, in turn, begins to move the locking arm 108 away from the locking plate 112. As the locking arm 108 applies a force to the locking plate 112 in the direction of rotation the locking plate 112 toward the unlocked position (i.e., clockwise in FIGS. 2A and 3A and counterclockwise in FIGS. 2B and 3B), the upward force applied to the ends 130A, 140A of the biasing levers 130, 140 by the biasing member B is greater than the upward force applied by the locking arm 108 to the opposite ends 130B, 140B of the biasing levers 130, 140, thus causing the levers 130, 140 to pivot the ends 130B, 140B of the biasing levers 130, 140 into and against the lower end or wall of the slot(s) 134, thereby displacing the locking plate 112 downwardly and forcing the arcuate side 112C of the locking plate 112 away from the tooth 128A of the plate engagement member 128. As the plate 112 then rotates under the force applied by the moving piston assembly 145 to the locking arm 108, the tooth 128A of the plate engagement member 128 is clear of the series of teeth 118 defined on the arcuate side 112C of the locking plate 112. As the piston assembly reaches the unactuated position illustrated by example in FIG. 4A, the tooth 128A of the plate engagement member 128 engages the step 120, thereby stopping further rotation of the locking plate 112 such that the device 100 is fully reset in the unactuated position thereof. The control signals CS2 are then illustratively switched to the OFF state, and thereafter may be selectively switched to the ON state as described above, to maintain the piston assembly 145 in the unactuated state illustrated by example in FIG. 4A. In the reset transition of the device 100 from the actuated position illustrated in FIGS. 3A and 3B to the unactuated position illustrated in FIGS. 2A and 2B, the locking plate 112 moves the fixation element 116 from its lowest vertical position to its highest vertical position to release the downward force, via the linking member 44, applied to the buckle(s) 42 and thereby release the tension applied to the web(s) 30A of the restraint harness 30.

Figure 5:
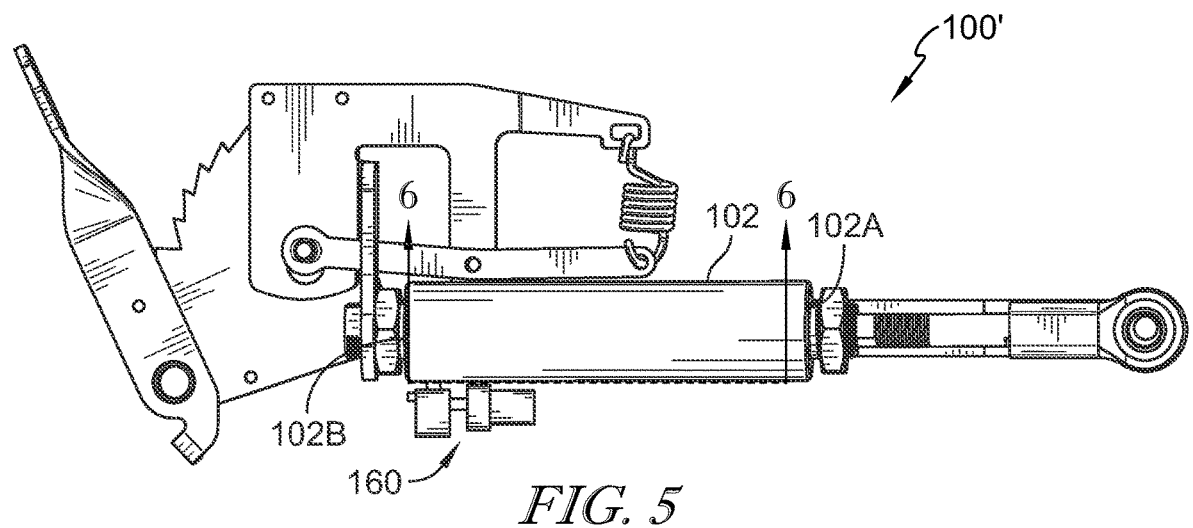
FIG. 5 is a front elevational view of another embodiment of the restraint web tensioning device illustrated in FIG. 1 and shown in an actuated or web tensioning state or position.
Figure 6A:
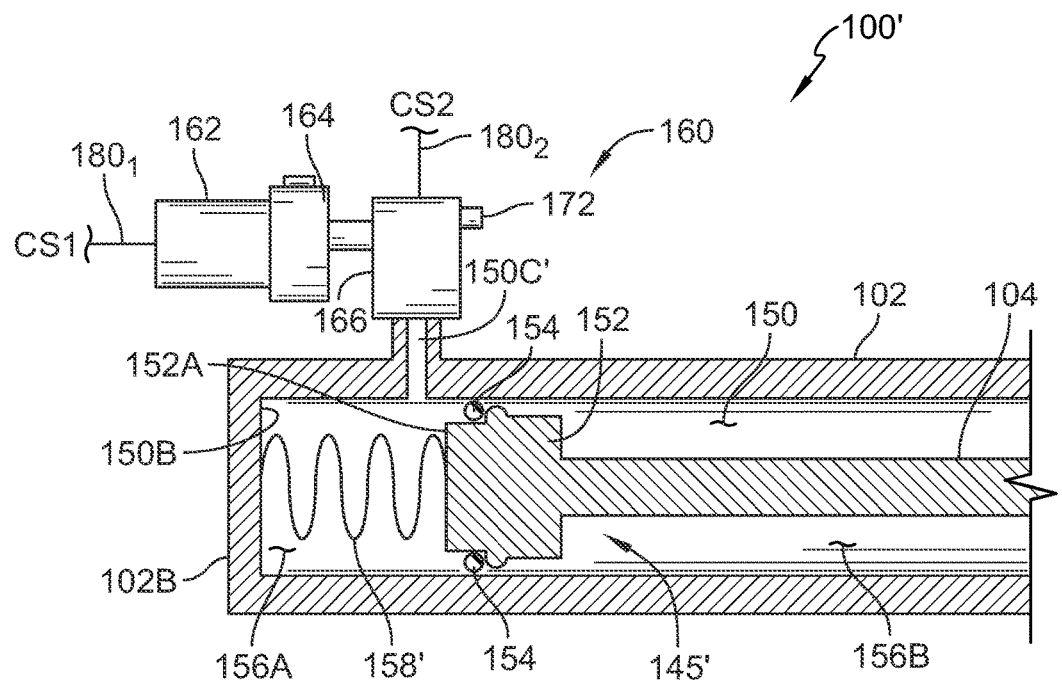
FIG. 6A is a cross-sectional view of the housing of the restraint web tensioning device of FIG. 5 as viewed along section lines 6-6 thereof and illustrating the piston assembly contained therein in the unactuated or web non-tensioning state or position of the device.
Figure 6B:
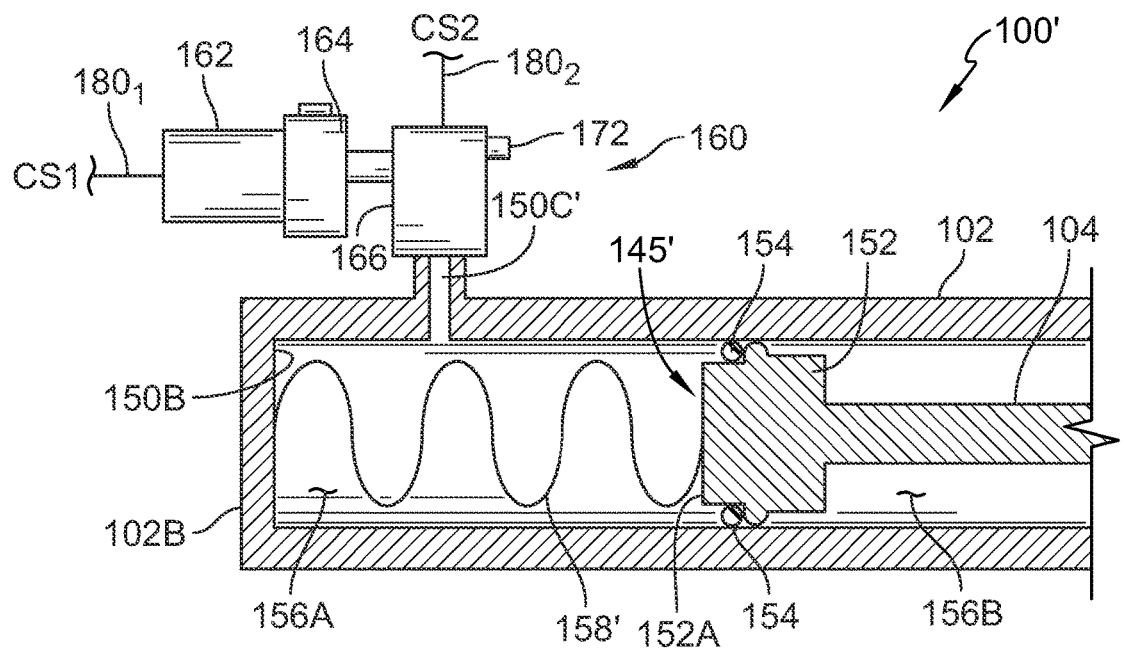
FIG. 6B is a cross-sectional view of the housing of the restraint web tensioning device of FIG. 5 as also viewed along section lines 6-6 thereof and illustrating the piston assembly contained therein in the actuated or web tensioning state or position of the device.

Referring now to FIGS. 5-6B, an alternate embodiment is shown of a web tensioning device 100'. In the illustrated embodiment, the device 100' is structurally identical to the web tensioning device 100 illustrated in FIGS. 2A-4B and described above with the exception that the actuator assembly 160 is operatively mounted to the housing 102 adjacent to the end 102B of the housing 102, and such that the actuator assembly 160, the piston assembly 145' and the biasing member 158' operate differently than that described with respect to FIGS. 4A and 4B. Like reference numbers used to identify various components of the device 100 are also used to identify like components of the device 100'. Although the actuator assembly 160 is shown in FIG. 5 as being mounted to a bottom surface of the housing 102 opposite the bracket 124, it will be understood that the actuator assembly 160 may alternatively be mounted at any position radially about and relative to the housing 102. In this embodiment, the biasing member 158' coupled to and between the end 150B of the chamber 150 defined by the housing 102 and the free end 152A of the piston 152 is illustratively configured to apply a biasing force to the piston assembly 145' which biases the piston assembly 145' toward the end 150B of the chamber 150, as illustrated by example in FIG. 6A. In the embodiment illustrated in FIG. 5, the device 100' is illustratively in the actuated or web-tensioning state or position, as illustrated in FIGS. 3A-3B and described above, it being understood that the device 100' is selectively controllable to the unactuated or web non-tensioning state or position as illustrated in FIGS. 2A and 2B and described above.

FIG. 6A illustratively represents the piston assembly 145' in the unactuated state of the web tensioning device 100' in which the device 100' is not applying any active tensioning force to the web(s) 30A via the combination of the linking member(s) and the buckle(s) 42. In the unactuated state illustrated in FIG. 6A, the control valve 66 is in the OFF state or in the VENT state such that the pressure within the chamber section 156A of the housing 102 is at or near ambient pressure, i.e., at or near the ambient pressure outside the housing 102, or is at least at a pressure that is less than that which would overcome the biasing force of the biasing member 158' to move the piston assembly 145' away from the end 150B of the chamber 150. In the unactuated state, the biasing member 158' thus biases the piston 152 to a position at which the guide member 104 is completely retracted within the housing 102 and at which the free end 152A of the piston 152 is spaced apart from the end 150B of the chamber 150 by a distance defined by the biasing member 158' in its smallest or shortest, biased configuration, e.g., fully coiled, as illustrated by example in FIG. 6A. In this position, the guide member 104 positions the locking arm 108 to maintain the locking plate 112 in the fully unlocked position illustrated by example in FIGS. 2A, and 2B and as described in detail above. In the unactuated state of the device 100', the locking plate 112 positions the fixation element 116 in its most upright position in which the linking member 44 is rotated, or is rotatable, to its most upright position as illustrated by example in FIGS. 2A and 2B.

Upon actuation of the device 100', i.e., via switching of the control signals CS2 to the ON state, the control valve 66 directs pressurized gas from the gas receptacle or container 164 into the chamber section 156A of the housing 102. The pressure of the gas entering the chamber section 156A and acting on the free end 152A of the piston 152 is illustratively greater than that which overcomes the compressive biasing force of the biasing member 158' so as to move the piston assembly 145' toward and into the chamber section 156B and to the actuated position of the device 100' illustrated by example in FIG. 6B. Illustratively, the pressure of the gas entering the chamber section 156A is selected so as to apply a force against the surface 152A of the piston 152 that is sufficiently greater than the biasing force of the biasing member 158' acting on the piston assembly 145', and that is sufficiently large to overcome any drag force resulting from the combination of the seal 154 against the wall of the chamber 150 and the weight of the piston assembly 145', so as to displace the piston assembly 145' from the unactuated position illustrated by example in FIG. 6A to the actuated position illustrated by example in FIG. 6B within a specified actuation time. In this regard, the pump 162, the gas receptacle or container 164 and the valve 166 are selected so as to supply to the chamber section 156A, via the valve 166, gas at a sufficiently high pressure so as to rapidly move, e.g., within a selected actuation time period such as, but not limited to less than 1 second or, in some embodiments, in the range of milliseconds, the piston assembly 145', against the biasing force of the biasing member 158', from the unactuated position illustrated by example in FIG. 6A to the actuated position illustrated by example in FIG. 6B. As the piston assembly 145' moves from the unactuated position illustrated in FIG. 6A to the actuated position illustrated in FIG. 6B, the guide member 104 axially extends out of the housing 102 to force the device 100' into the actuated state as described above with respect to FIGS. 4A and 4B. In the transition of the device from the unactuated position of the device 100' illustrated in FIG. 6A to the actuated position of the device 100' illustrated in FIG. 6B, the locking plate 112 moves the fixation element 116 from its highest position to its lowest position to apply a downward force, via the linking member 44, to the buckle(s) 42 to thereby apply tension to the web(s) 30A of the restraint harness 30.

In the embodiment illustrated in FIGS. 5-6B, the device 100' is illustratively resettable, via electronic control of the actuator assembly 160, from the actuated state or position illustrated in FIGS. 3A, 3B and 6B to the unactuated state or position illustrated in FIGS. 2A, 2B and 6A. The device 100' is reset via switching of the control signals CS2 to the VENT state so that the pressurized gas in the chamber section 156A of the housing 102 begins to travel back through valve 166 and exit the valve 166 via the vent 172. When, as a result of the venting gas, the pressure in the chamber section 156A decreases below that required to maintain the piston assembly 145 in the fully actuated position illustrated by example in FIG. 6B, the compressive force of the biasing member 158' acting on the piston 152 begins to draw the piston assembly 145' toward the end 150B of the chamber 150, and eventually to the unactuated position illustrated by example in FIG. 6A. As the piston assembly 145' moves from the actuated position illustrated in FIG. 6B toward the unactuated position illustrated in FIG. 6A, the guide member 104 axially extends into the housing 102 which forces the device 100' to reset to the unactuated position thereof as described above with respect to FIGS. 4A and 4B. In some embodiments, the control signals CS2 are then switched to the OFF state until thereafter changed to the ON state to re-actuate the device 100'. In alternate embodiments, the control signals CS2 may remain in the VENT state until thereafter changed to the ON state. In the reset transition of the device 100' from the actuated position illustrated in FIGS. 3A, 3B and 6B to the unactuated position illustrated in FIGS. 2A, 2B and 6A, the locking plate 112 moves the fixation element 116 from its lowest position to its highest position to releasing the downward force, via the linking member 44, applied to the buckle(s) 42 to thereby release the tension applied to the web(s) 30A of the restraint harness 30.

Figure 7:
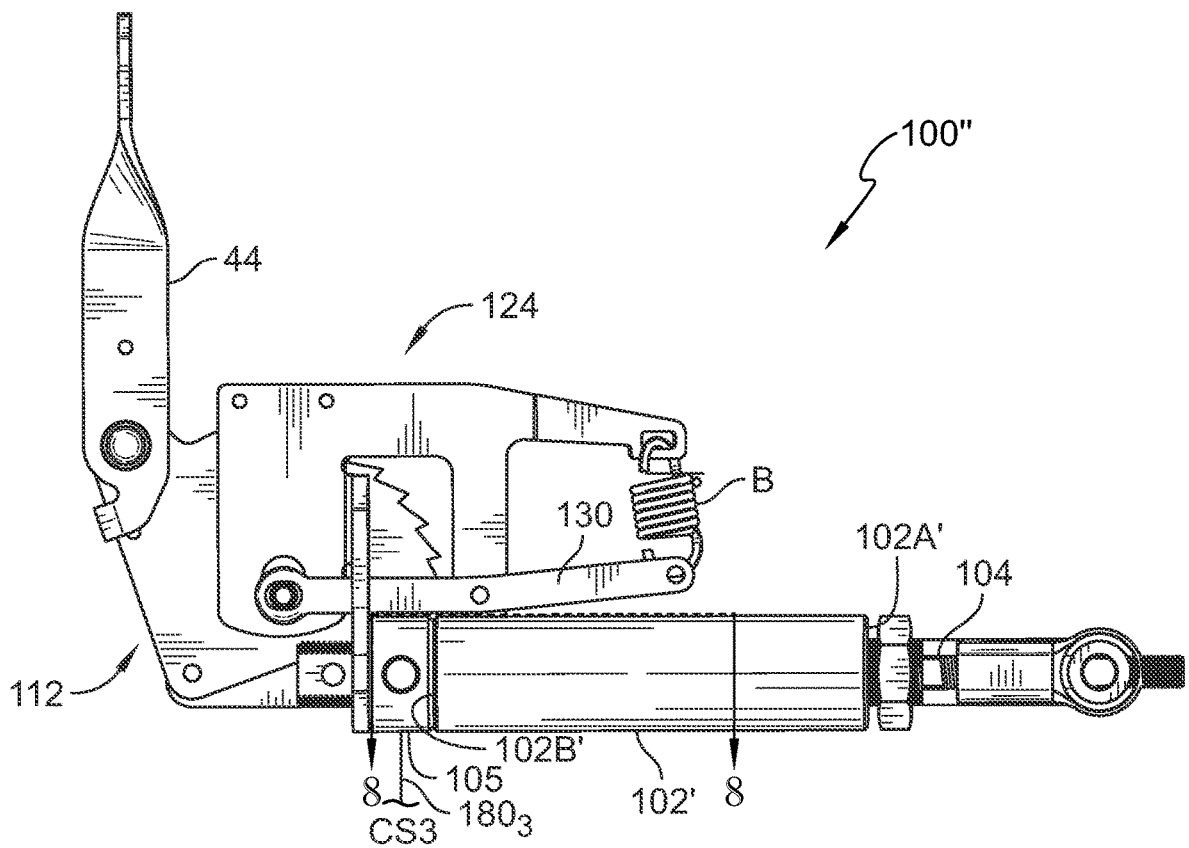
FIG. 7 is a front elevational view of yet another embodiment of the restraint web tensioning device illustrated in FIG. 1 and shown in an unactuated or web non-tensioning state or position.
Figure 8A:
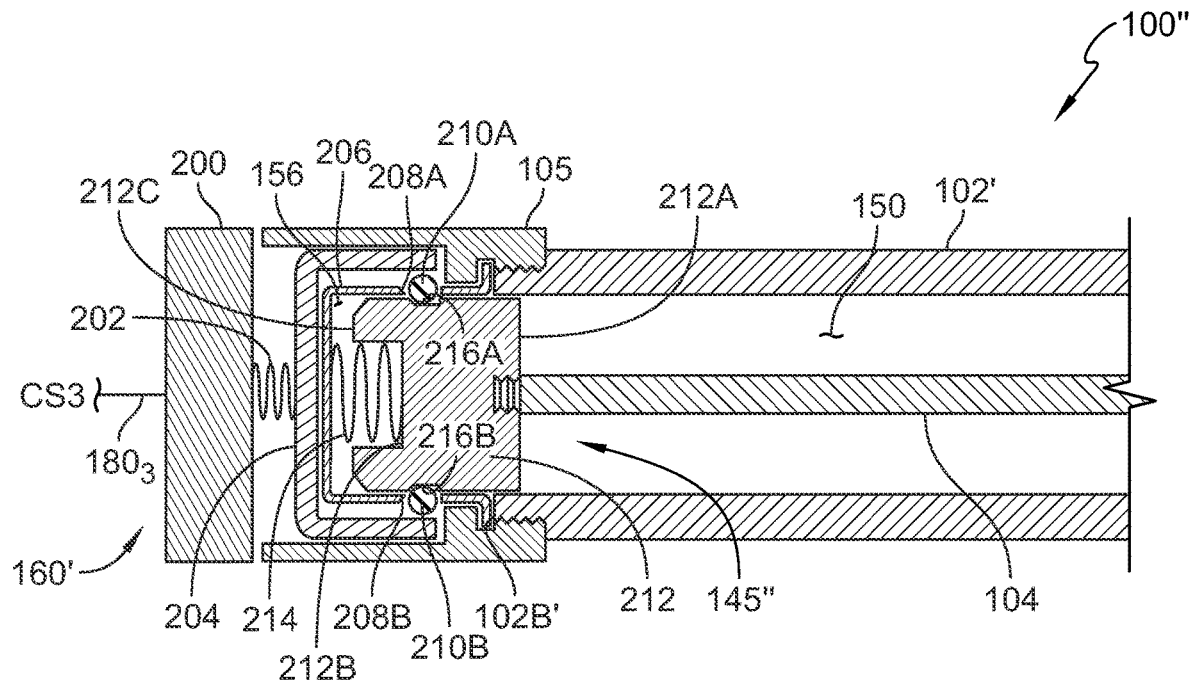
FIG. 8A is a cross-sectional view of the housing of the restraint web tensioning device of FIG. 7 as viewed along section lines 8-8 thereof and illustrating the piston assembly contained therein in the unactuated or web non-tensioning state or position of the device.
Figure 8B:
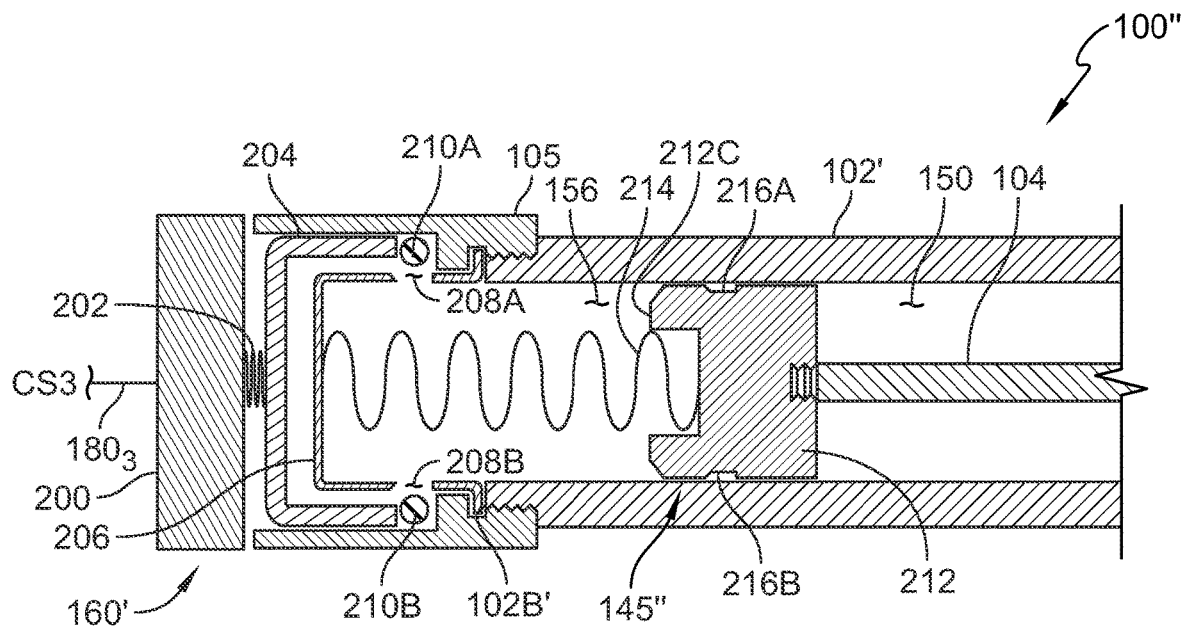
FIG. 8B is a cross-sectional view of the housing of the restraint web tensioning device of FIG. 7 as also viewed along section lines 8-8 thereof and illustrating the piston assembly contained therein in the actuated or web tensioning state or position of the device.

Referring now to FIG. 7, another alternate embodiment is shown of a web tensioning device 100", and to FIGS. 8A-8B where alternate embodiments are shown of a piston assembly 145" disposed within the housing 102' of the device 100" and of an electronically-controlled actuator assembly 160' for controlling movement of the piston assembly 145" within and along the interior of the housing 102'. The web tensioning device 100" is illustratively identical to the web tensioning devices 100 and 100' illustrated in FIGS. 2A-3B and 5 respectively and described in detail above, except that an actuation chamber 105, containing the alternate embodiment of the actuator assembly 160' of the device 100", is operatively coupled to the end 102B' of the cylinder 102' opposite the end 102A' thereof, and the piston assembly 145" of the device 100" replaces the piston assembly 145 of the device 100 and the piston assembly 145' of the device 100'. Like reference numbers used to identify various components of the devices 100 and 100' are also used to identify like components of the device 100". In the embodiment illustrated in FIG. 7, the device 100" is illustratively in the unactuated or web non-tensioning state or position, as illustrated in FIGS. 2A-2B and described above, it being understood that the device 100" is selectively controllable, as will be described in detail below, to the actuated or web tensioning state or position as illustrated in FIGS. 3A and 3B and described above.

In the alternate embodiment illustrated in FIGS. 7 and 8A-8B, the actuator assembly 160' includes a conventional electromagnet 200 housed within the actuation chamber 105. The electromagnet 200 is illustratively configured to be electrically connected to a control circuit via a signal path $180_3$ so as to receive control signals CS3 from the control circuit for controlling operation of the electromagnet 200 (see, e.g., FIG. 9). An end of the electromagnet 200 facing the piston assembly 145" is spaced apart from, and is coupled via a biasing member 202 to, a ferromagnetic member 204 also housed within the actuation chamber 105. Illustratively, the ferromagnetic member 204 is provided in the form of a ferromagnetic cup with the closed end of the cup 204 coupled to the electromagnet 200 via the biasing member 202 and with the open end of the cup 204 facing the piston assembly 145". The ferromagnetic member 204 is illustratively axially movable within and along the actuation chamber 105 toward and away from the electromagnet 200. The biasing member 202 is illustratively configured to bias the ferromagnetic cup away from the electromagnet 200 and toward the piston assembly 145' in the unactuated state of the device 100', i.e., in the non-energized state of the electromagnet 200 (in which the electromagnet 200 does not produce a magnetic field), as shown by example in FIG. 8A. In the illustrated embodiment, the biasing member 202 is provided in the form of a coil spring, although in alternate embodiments two or more such coil springs may be implemented and/or one or more other conventional biasing members may be operatively coupled between the electromagnet 200 and the ferromagnetic member 204.

The actuator assembly 160' further includes a stationary bracket 206 also housed within the actuation chamber 105 and fixed to and between the actuation chamber 105 and the end 102B' of the housing 102'. The bracket 206 is illustratively also cup-shaped with the closed end of the cup 206 facing the open end of the cup-shaped ferromagnetic member 204 and with the open end of the cup 206 facing the piston assembly 145". The bracket 206 illustratively defines radially opposed openings 208A and 208B through a sidewall thereof, each sized to receive therethrough a respective detent 210A, 210B, e.g., each in the form of a spring-biased ball. Illustratively, the detents 210A, 210B are biased radially outwardly, i.e., so as to normally extend radially outwardly from the respective openings 208A, 208B.

The piston assembly 145" illustratively includes a piston 212 having one face 212A coupled to the guide member 104 described above, and having an opposite face 212B coupled to one end of another biasing member 214. An opposite end of the biasing member 214 is coupled to the surface of the bracket 206 facing the piston assembly 145". In the illustrated embodiment, the face 212B of the piston 212 is recessed relative to a distal face 212C of the piston 212 in order to accommodate the length of the biasing member 214 in its shortest, compressed state. The biasing member 214 is illustratively configured to bias the piston assembly 145" away from the face of the stationary bracket 206 to which the biasing member 214 is coupled. In the illustrated embodiment, the biasing member 214 is provided in the form of a coil spring, although in alternate embodiments two or more such coil springs may be implemented and/or one or more other conventional biasing members may be operatively coupled between the piston 212 and the bracket 206. A sidewall of the piston 212 illustratively defines radially opposed slots or channels 216A and 216B therein each sized to receive therein a respective one of the detents 210A, 210B. Illustratively, the slots or channels 216A, 216B are sized and configured, e.g., chamfered along the distal end, to facilitate movement therein and therefrom of the detents 210A, 210B as the piston assembly 145" is moved between the unactuated or web non-tensioning state or position and the actuated or web tensioning state or position of the device 100" as will be described in detail below. As the piston assembly 145" is moved between the unactuated and the actuated positions thereof, e.g., as illustrated by example in FIGS. 8A and 8B respectively, an axial length of a chamber section 156 of the chamber 150 defined by and within the housing 102' between the piston 212 and the inwardly-facing surface of the bracket 206 varies based on the length of the biasing member 214.

The actuator assembly 160' illustratively has two control states which may be selected by different respective states of a control signal CS3 (or by different control signals CS3): (1) an OFF state in which the electromagnet 200 is de-energized so as to not produce a magnetic field, and such that the biasing member 202, under such conditions, biases the ferromagnetic cup 204 axially away from the electromagnet 200 and axially toward the bracket 206 and the piston assembly 145" as illustrated by example in FIG. 6A, and (2) an ON state in which the electromagnet 200 is energized so as to produce a magnetic field which attracts the ferromagnetic cup 204. The electromagnet 200 is illustratively selected such that the magnetic field produced by the electromagnet 200, when energized in the ON state, is sufficiently strong to overcome the biasing force of the biasing member 202 so as to draw the ferromagnetic cup 204 axially toward the electromagnet 200 and axially away from the bracket 206 and the piston assembly 145" as illustrated by example in FIG. 6B.

FIG. 8A illustratively represents the piston assembly 145" in the unactuated state of the web tensioning device 100" in which the device 100" is not applying any active tensioning force to the web(s) 30A via the combination of the linking member(s) and the buckle(s) 42. In the unactuated state illustrated in FIG. 8A, the control signal(s) CS3 is/are in the OFF state such that the electromagnet 200 does not produce a magnetic field. The piston 212 is positioned adjacent to the surface of the bracket 206 to which the biasing member 214 is coupled, such that the slots or channels 216A, 216B align with, i.e., are juxtaposed with, the openings 208A, 208B defined through the bracket 206. Because the electromagnet 200 is not producing a magnetic field, the biasing member 202 biases the ferromagnetic member 204 away from the electromagnet 200 and toward the bracket 206 and piston assembly 145" such that the open-ended sidewall of the cup-shaped ferromagnetic member 204 extends over the openings 208A, 208B defined through the bracket 206. In this position of the ferromagnetic member 204, the sidewall of the cup-shaped ferromagnetic member 204 forces the detents 210A, 210B through the openings 208A, 208B of the bracket 206 and into the slots or channels 216A, 216B. In this position, the detents 210A, 210B act on the walls of the openings 208A, 208B of the bracket 206 and on the slots or channels 216A, 216B of the piston 212 to prevent the biasing member 214 from forcing the piston 212, and the piston assembly 145", away from the bracket 206, and the sidewall of the cup-shaped ferromagnetic member 204 prevents the detents 210A, 210B from extending, under bias, radially outwardly from the slots or channels 216A, 216B of the piston 212. The actuator assembly 160' acting on the piston assembly 145" as illustrated by example in FIG. 8A thus locks the web tensioning device 100" in the unactuated state or position.

Upon actuation of the device 100", i.e., via switching of the control signals CS3 to the ON state, the electromagnet 200 produces a magnetic field which attracts the ferromagnetic member 206 thereto. Illustratively, the electromagnet 200 and the biasing member 202 are selected such that the strength of the magnetic field produced by the electromagnet 200, when activated, is sufficient to overcome the biasing force of the biasing member 202 so that the magnetic field draws the ferromagnetic member 204 toward the electromagnet 200 as the biasing member 202 compresses as illustrated by example in FIG. 8B. As the ferromagnetic member 204 moves toward the electromagnet 200, the open-ended sidewall of the ferromagnetic member 204 clears the openings 208A, 208B defined through the bracket 206 such that the radially outwardly-biased detents 210A, 210B extend, under bias, radially outwardly from the slots or channels 216A, 216B of the piston 212 and, in the illustrated embodiment, outwardly away from the openings 208A, 208B of the bracket 206. With the detents 210A, 210B no longer restricting axial movement of the piston 212, the biasing force of the biasing member 214 acting on the piston assembly 145" moves the piston assembly 145" axially away from the bracket 206 and to the actuated position illustrated by example in FIG. 8B. Illustratively, the biasing force of the biasing member 214 is selected so as to cause the piston assembly 145" to rapidly move, e.g., within a selected actuation time period such as, but not limited to less than 1 second or, in some embodiments, in the range of milliseconds, from the unactuated position illustrated by example in FIG. 8A to the actuated position illustrated by example in FIG. 8B. As the piston assembly 145" moves from the unactuated position illustrated in FIG. 8A to the actuated position illustrated in FIG. 8B, the guide member 104 axially extends out of the housing 102' to force the device 100" into the actuated state as described above with respect to FIGS. 4A and 4B. In the transition of the device from the unactuated position of the device 100" illustrated in FIG. 8A to the actuated position of the device 100" illustrated in FIG. 8B, the locking plate 112 moves the fixation element 116 from its highest position to its lowest position to apply a downward force, via the linking member 44, to the buckle(s) 42 to thereby apply tension to the web(s) 30A of the restraint harness 30.

In the embodiment illustrated in FIGS. 7-8B, the device 100" is illustratively electrically and manually resettable from the actuated state or position illustrated in FIGS. 3A, 3B and 8B to the unactuated state or position illustrated in FIGS. 2A, 2B and 8A. The device 100" can be electrically and manually reset to the unactuated state or position by switching of the control signal(s) CS3 to the OFF state and forcing the locking plate 112 downwardly, e.g., by manually forcing the buckle 42 and linking member 44 downwardly, sufficiently to overcome the biasing force of the biasing member such that the biasing levers 130, 140 act on the locking plate 112 to force the toothed surface 112C away from the tooth 128A of the plate engagement member 128 (see FIGS. 2B and 3B). The locking plate 112 is then rotated (e.g., clockwise in the orientation illustrated in FIGS. 2A and 3A, and counterclockwise in the orientation illustrated in FIGS. 2B and 3B), e.g., by manually forcing the buckle 42 and linking member 44 upwardly, so as to cause the locking arm 108 to axially force the guide member 104, and thus the piston assembly 145", back toward the bracket 206. Illustratively, the manual force applied to the locking plate 112 to reset the device 100" must be sufficient to overcome the opposing biasing force of the biasing member 214 acting on the piston assembly 145" in order to move the piston assembly 145" axially toward the bracket 206.

With the electromagnet 200 de-energized, the biasing member 202 forces the ferromagnetic member 204 toward the bracket 206 such that the open-ended sidewall of the ferromagnetic member 204 recaptures the detents 210A, 210B and forces the radially outwardly-biased detents 210A, 210B back into the openings 208A, 208B defined through the bracket 206. As the piston assembly 145" moves axially toward the bracket 206, the slots or channels 216A, 216B of the piston 212 will eventually realign with the openings 208A, 208B and the radially inward force applied by the open-ended sidewall of the ferromagnetic member 204 to the detents 210A, 210B will force the detents 210A, 210B into the slots or channels 216A, 216B of the piston 212, thereby securing or locking the piston assembly 145" in the unactuated state or position of the device 100" illustrated by example in FIG. 8A. In the manual reset transition of the device 100" from the actuated position illustrated in FIGS. 3A, 3B and 8B to the unactuated position illustrated in FIGS. 2A, 2B and 8A, the fixation element 116 moves from its lowest position to its highest position to thereby release the tension applied to the web(s) 30A of the restraint harness 30.

Figure 9:
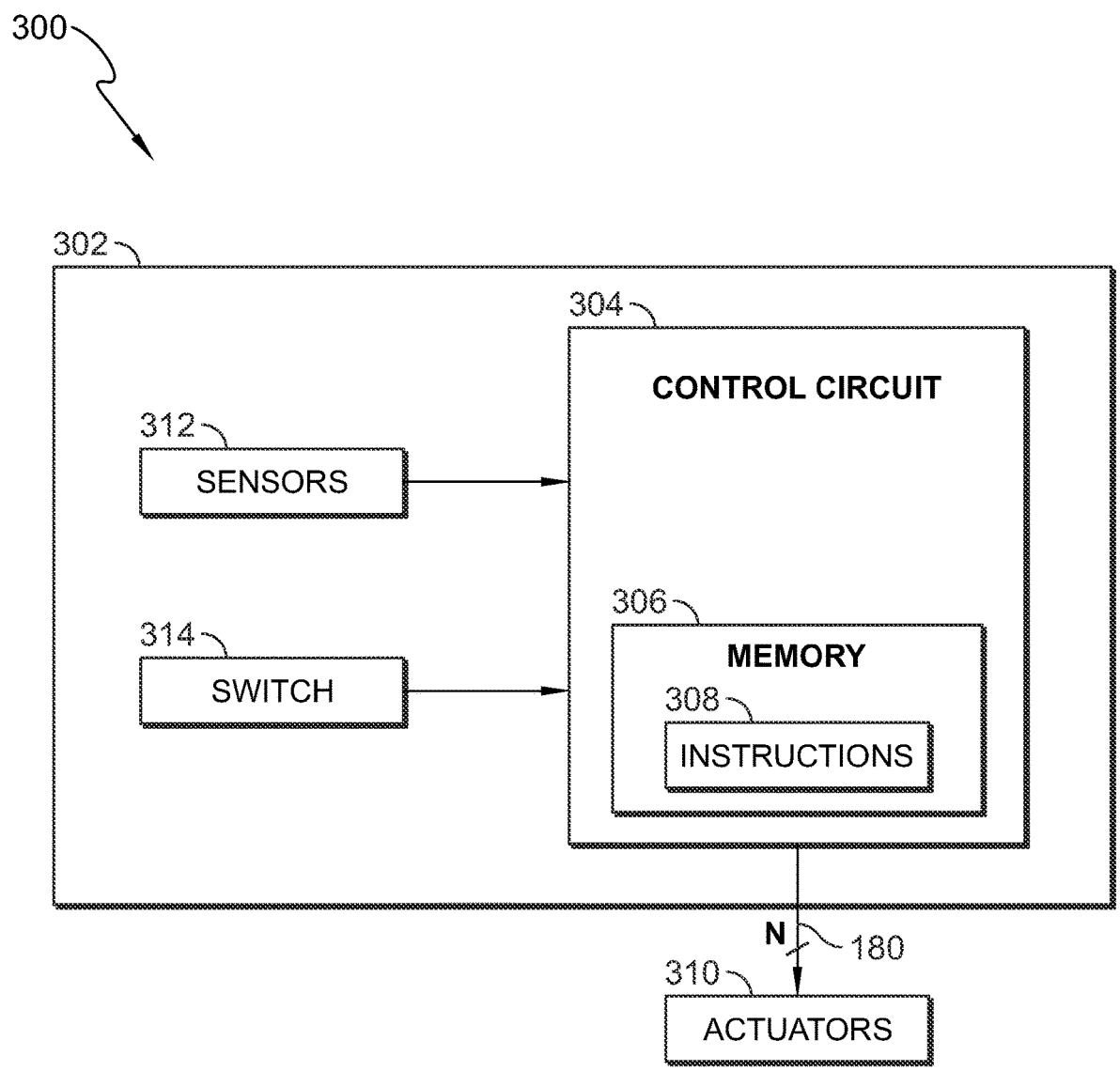
FIG. 9 is a simplified diagram of an electronic control system for controlling operation of at least the restraint web tensioning device illustrated in FIGS. 2A-8B.

Referring now to FIG. 9, an embodiment is shown of a control system 300 electrically connected to one or more actuators 310 via a number, N, of signal paths 180, where N may be any positive integer. In the embodiments of the resettable web tensioning device 100, 100' illustrated by example in FIGS. 2A-4B and 6A-6B respectively, the one or more actuators 310 illustratively include at least the electronically-controlled pump 162 and the electronically-controlled valve 166 of the electronically-controlled actuator assembly 160 electrically connected to the control system 300 via the signal paths $180_1$ and $180_2$ respectively. In the embodiment of the resettable web tensioning device 100" illustrated by example in FIGS. 6-8B, the one or more actuators 310 illustratively include at least the electromagnet 200 electrically connected to the control system 300 via the signal path $180_3$. In any of these embodiments, occupant seat restraint system 10, illustrated by example in FIG. 1, may include the web retractor 50 in the form of an electronically or electromechanically controlled retractor, and in such embodiments the one or more actuators 310 may further illustratively include the locking/unlocking actuator 52 operatively coupled to the web retractor 50 and electrically connected to the control system 300 via the signal path 180₄. Alternatively or additionally, the occupant seat restraint system 10 may include one or more additional electronically and/or electromechanically controlled occupant restraint devices, and in such embodiments the one or more actuators 310 may include one or more electronically and/or electromechanically controlled actuators, electrically connected to the control system 300 via one or more of the signal paths 180, for controlling operation of the one or more additional occupant restraint devices. As one example of such an additional electronically and/or electromechanically controlled occupant restraint devices, which should not be considered to be limiting in any way, the occupant restraint system may include at least one conventional supplemental inflatable restraint device mounted to and/or integral with the occupant seat 12, and/or mounted to and/or integral with one or more structures adjacent to the seat 12. Such supplemental inflatable restraint device(s) will illustratively include at least one actuator responsive to an actuator activation signal produced by the control system 300 to cause the supplemental inflatable restraint device(s) to deploy in a conventional manner toward and/or about the head and/or torso of the occupant 26 of the seat 12.

In the embodiment illustrated in FIG. 9, and in addition to the one or more actuators 310, the control system 300 includes a housing 302 in or to which a conventional control circuit 304, one or more sensors 312 and, in some embodiments, one or more switches 314, are mounted. The housing 302 is illustratively mounted to a support surface that is rigidly coupled to the motor vehicle in which the vehicle seat 12 is mounted. In one embodiment, for example, the housing 302 may be mounted to the floor 16 of the motor vehicle. In some alternate embodiments, the housing 302 may be mounted to the seat base 20 which is itself rigidly secured to the floor 16 of the motor vehicle. Those skilled in the art will recognize other support structures within the motor vehicle to which the housing 302 may be mounted, and it will be understood that all such other support structures are intended to fall within the scope of this disclosure.

The control circuit 304 is operatively coupled, e.g., via one or more signal paths, to the one or more sensors 312, to the one or more switches 314 and to the one or more actuators 310. The control circuit 304 is conventional and may include one or more microprocessor-based control circuits and/or other conventional control circuits configured to execute instructions for controlling the one or more actuators 310. In the illustrated embodiment, the control circuit 304 includes a conventional memory unit 306. In some alternate embodiments, the memory unit 306 may be separate from the control circuit 304 and electrically connected thereto in a conventional manner. In other alternate embodiments, the control circuit 304 may include at least a portion of the memory unit 306, and at least another portion of the memory unit 306 may be external to, and electrically connected to, the control circuit 304. In any case, the memory unit 306 illustratively has one or more sets of instructions 308 stored therein executable by the control circuit 304 to cause the control circuit to produce one or more actuator control signals for controlling operation of the one or more actuators 310.

In some embodiments, as described above, the one or more sensors 312 may include at least one pressure sensor for sensing the gas pressure within the pump 162, within the gas chamber or reservoir 164, within the valve 166 and/or within the chamber 150 of the housing 102, and for producing one or more pressure signals corresponding thereto. In such embodiments, the instructions 308 illustratively include instructions executable by the control circuit 304 to control operation of the pump 162 and/or the valve 166 to control the gas pressure within the pump 162, within the gas chamber or reservoir 164, within the valve 166 and/or within the chamber 150 of the housing 102, as described above, based on the one or more pressure signals.

Additional examples of the one or more sensors 312 may include, but are not limited to, any one or combination of: (1) one or more conventional vehicle speed sensors suitably mounted to or carried by the motor vehicle in which the occupant seat restraint system 10 is mounted and configured to produce one or more signals corresponding to the traveling speed of the motor vehicle, (2) one or more conventional weight sensors suitably mounted to or carried by the motor vehicle and configured to produce one or more signals corresponding to the weight of the motor vehicle and from which the control circuit 304 is configured to determine the mass of the motor vehicle, (3) one or more conventional occupant weight sensors suitably mounted to the occupant seat 12 and configured to produce one or more signals corresponding to the weight of an occupant seated in the occupant seat 12, (4) one or more conventional sensors suitably mounted to the occupant seat 12, to a frame component of the motor vehicle and/or to one or more other structures within the motor vehicle and configured to produce one or more signals corresponding to a position, e.g. fore/aft, of the occupant seat 12 relative to a reference position, (5) one or more conventional sensors suitably mounted to the occupant seat 12, to the restraint harness 30, to the web(s) 30A, to the controllable locking retractor 50 and/or actuator 52 in embodiments which include them, and/or to one or more other suitable structures within the motor vehicle and configured to produce one or more signals corresponding to the load, i.e., the force, applied to the web(s) 30A by the occupant 26 of the seat 12 under dynamic loading conditions, e.g., one or more force sensors, one or more web-length sensors (configured to sense a (changing) length of web(s) 30A extending from the retractor 50, (6) one or more conventional vehicle rotational movement sensors suitably mounted to or carried by the motor vehicle and configured to produce one or more signals corresponding to movement of the motor about one or more vehicle axes, e.g., one or more pitch, roll and/or yaw sensors, (7) one or more conventional vehicle dynamics sensors suitably mounted to the one or more wheels, axle, frame and/or other structure of the motor vehicle and configured to produce one or more signals corresponding to vertical movement of the motor vehicle relative to a reference position of the motor vehicle, e.g., one or more accelerometers configured to sense dynamic vertical movement of the motor vehicle relative to a reference position of the motor vehicle, one or more vehicle height sensors configured to produce one or more signals corresponding to a distance between a point on a suspension, chassis or body of the motor vehicle and a driving surface on which the motor vehicle is being driven, or the like, (8) at least one global positioning system (GPS) sensor suitably mounted to or carried by the motor vehicle and configured to produce one or more signals corresponding to a geographic position of the motor vehicle, e.g., latitude, longitude and/or altitude, (9) one or more conventional brake sensors suitably mounted to or within the motor vehicle and configured to produce one or more signals corresponding to brake force applied by service brakes of and to the motor vehicle, e.g., one or more conventional brake pedal sensors configured to produce one or more signals corresponding to an amount of force (and, in some embodiments, rate of force application) applied to a brake pedal of the motor vehicle, (10) one or more conventional accelerometers mounted to the motor vehicle and configured to produce one or more signals corresponding to a rate of acceleration of the motor vehicle, etc., (11) one or more conventional impact sensors, e.g., one or more accelerometers or the like, suitably mounted to the motor vehicle and configured to produce one or more impact signals from which the control circuit 304 is configured to determine whether an impact of the motor vehicle with another object is occurring or imminent, (12) one or more conventional roll sensors suitably mounted to the motor vehicle and configured to produce one or more signals from which the control circuit 304 is configured to determine whether rollover of the motor vehicle is occurring or imminent, and the like. In embodiments which include the GPS sensor (or other motor vehicle location sensor, system or service), the memory 306 may have stored therein (or the control circuit 304 may otherwise have access to via the Internet or other mobile wireless service) one or more geographical maps via which the control circuit 304 may determine the geographic position of the motor vehicle relative to one or more countries, states, cities, landmarks, terrain topography, etc.

In some embodiments, the one or more switches 314 may include one or more manually activated switches suitably mounted within the motor vehicle and electrically coupled to the control circuit 304, and the memory 306 may have stored therein instructions 308 executable by the control circuit 304 to be responsive to manual activation of at least one of the one or more manually activated switches 314 to control the resettable web tensioning device 100, 100', 100" from the unactuated or web non-tensioning state or position thereof to the actuated or web tensioning state or position thereof, as these terms are described above, and/or to control the resettable web tensioning device 100, 100' from the actuated or web tensioning state or position thereof to the unactuated or web non-tensioning state or position thereof, i.e., to electronically reset the device 100, 100'. In some embodiments which include the retractor 50 in the form of an electronically or electromechanically controlled retractor including an electronically or electromechanically controlled actuator 52, the instructions 308 may further include instructions 308 executable by the control circuit 304 to be responsive to manual activation of the at least one of the one or more manually activated switches 314 to control the actuator 52 to lock or unlock the retractor 50. In any case, the at least one of the one or more manually-activated switches 314 may be located anywhere within the motor vehicle that is accessible by the occupant 26 of the seat 12. Example locations include, but are not limited to, coupled to, or integrated into, the web guide 38, the buckle 42, the seat bottom 22, the seat base 20, a console of the motor vehicle, a dashboard or instrument panel of the motor vehicle, or other suitable structure within the motor vehicle.

Figure 10:
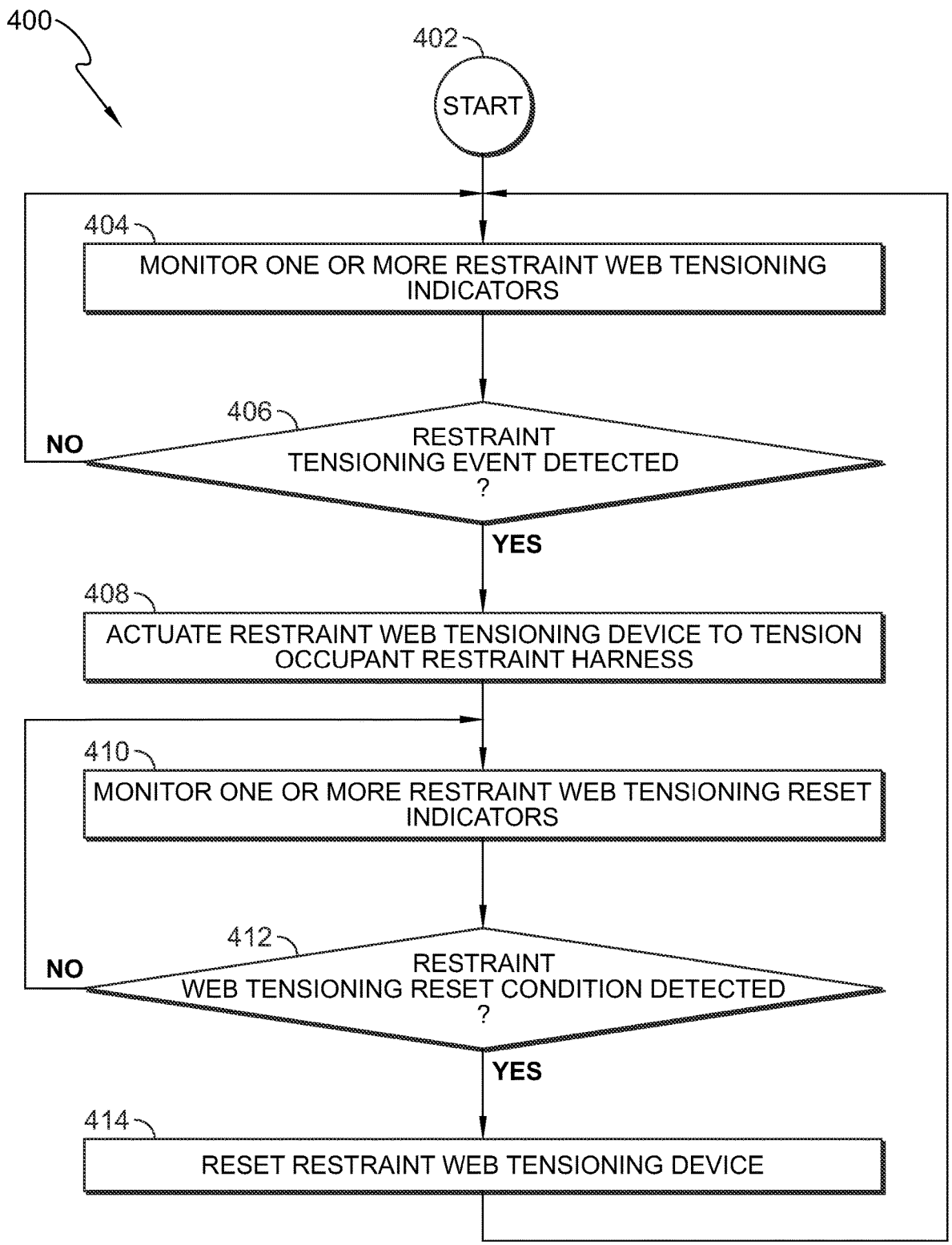
FIG. 10 is a simplified flowchart illustrating an embodiment of a process, executable by one or more components of the control system illustrated in FIG. 9, for controlling operation of at least the restraint web tensioning device illustrated in any of FIGS. 2A-8B.

Alternatively to, or in addition to, control of the resettable web tensioning device 100, 100', 100" and, in some embodiments, control of the actuator 52 of the web retractor, by the control circuit 304 in response to manual actuation/deactuation of the at least one of the one or more manually activated switches 314 as just described, the instructions 308 stored in the memory 306 may further include instructions 308 executable by the control circuit 304 to be responsive to signals produced by one or any combination of the sensor(s) 312 to similarly control the resettable web tensioning device 100, 100', 100" and, in some embodiments, to similarly control the actuator 52 of the web retractor and, in some embodiments, to control one or more others of the actuators 310. One example such control process 400 for controlling operation of the web tensioning device 100, 100', 100" (and one or more others of the actuators 310) is illustrated in FIG. 10, wherein the process 400 is illustratively stored in the memory 306 in the form of instructions 308 executable by the control circuit 304. It will be understood that the process 400 is provided only by way of example, and should not be considered limiting of the control system 300 in any way.

Referring now to FIG. 10, the process 400 begins at step 402, and thereafter at step 404 the control circuit 304 is operable to monitor one or more restraint web tensioning indicators. Illustratively, the one or more restraint web tensioning indicators monitored at step 404 may be or include any of the signals produced by at least one of the one or more sensors 312 and/or by at least one of the one or more switches 314 in the form of a tensioning event signal; that is, a signal produced by at least one of the sensors 312 indicative of an event associated with the restraint harness 30, the seat 12 and/or the motor vehicle in which the seat 12 is mounted to which the control circuit 304 will be responsive to control the actuator(s) 310 to cause the resettable web tensioning device 100, 100', 100" to apply tension to the occupant restraint harness 30. Thereafter at step 406, the control circuit 304 is operable to determine, based on the monitoring step 404 whether a restraint tensioning event has occurred. If not, execution of the process 400 returns to step 404. If, on the other hand, the control circuit 304 has determined at step 406 that a restraint tensioning event has occurred, execution of the process 400 advances to step 408 where the control circuit 304 is operable to produce the control signals $CS_2$ or $CS_3$ in a manner that actuates the restraint web tensioning device 100, 100', 100" to the actuated or web-tensioning state or position as described above. In some embodiments which include the electronically or electromechanically controlled retractor 50 and associated actuator 52, step 408 may also include producing one or more control signals to control the actuator 52 to lock the retractor 50. In some embodiments which include other actuators 310, step 408 may also include producing one or more control signals to control such one or more actuators to activate or deactivate other occupant and/or seat restraint devices. In any case, it will be understood that the restraint tensioning event determined at step 406 may be or include one or any combination of, and/or any function of one or more of, the signal(s) produced by one or more of the sensors 312 being above or below a threshold value thereof and/or within a specified signal value range thereof, and/or manual activation of one or more of the switches 314.

Following step 408, the process 400 advances to step 410 where the control circuit 304 is operable to monitor one or more restraint web tensioning reset indicators. Illustratively, the one or more restraint web tensioning reset indicators monitored at step 410 may be or include any of the reset signals produced by the one or more sensor 312, and/or any of the signals produced by the one or more switches 314 in the form of a reset signal; that is, a signal produced by at least one of the sensors 312 and/or by at least one of the switches 314 indicative of an event associated with the restraint harness 30, the seat 12 and/or the motor vehicle in which the seat 12 is mounted to which the control circuit 304 will be responsive to control the actuator(s) 310 to cause the resettable web tensioning device 100, 100', 100" to release tension on the occupant restraint harness 30. Alternatively or additionally, the web reset event may be or include a lapse of a specified time period after executing step 408, or the like. Thereafter at step 412, the control circuit 304 is operable to determine, based on the monitoring step 410 whether a restraint tensioning reset event has occurred. If not, execution of the process 400 returns to step 410. If, on the other hand, the control circuit 304 has determined at step 412 that a restraint tensioning event has occurred, execution of the process 400 advances to step 414 where the control circuit 304 is operable to produce the control signal(s) $CS_2$ a manner that deactuates or resets the restraint web tensioning device 100, 100', to the unactuated or web non-tensioning state or position as described above, or to produce the control signal(s) $CS_3$ in a manner that de-energizes the electromagnet 200 so that the restraint web tensioning device 100" can be manually reset to the unactuated or web non-tensioning state or position as described above. In some embodiments which include the electronically or electromechanically controlled retractor 50 and associated actuator 52, step 414 may also include producing one or more control signals to control the actuator 52 to unlock the retractor 50. In some embodiments which include other actuators 310, step 414 may also include producing one or more control signals to control such one or more actuators to activate or deactivate other occupant and/or seat restraint devices. In any case, it will be understood that the restraint tensioning reset event determined at step 410 may be or include one or any combination of, and/or any function of one or more of, the signal(s) produced by one or more of the sensors 312 being above or below a threshold value thereof and/or within a specified signal value range thereof, and/or manual activation of one or more of the switches 314, and/or lapse of a specified time period following execution of step 408.

Figure 11A:
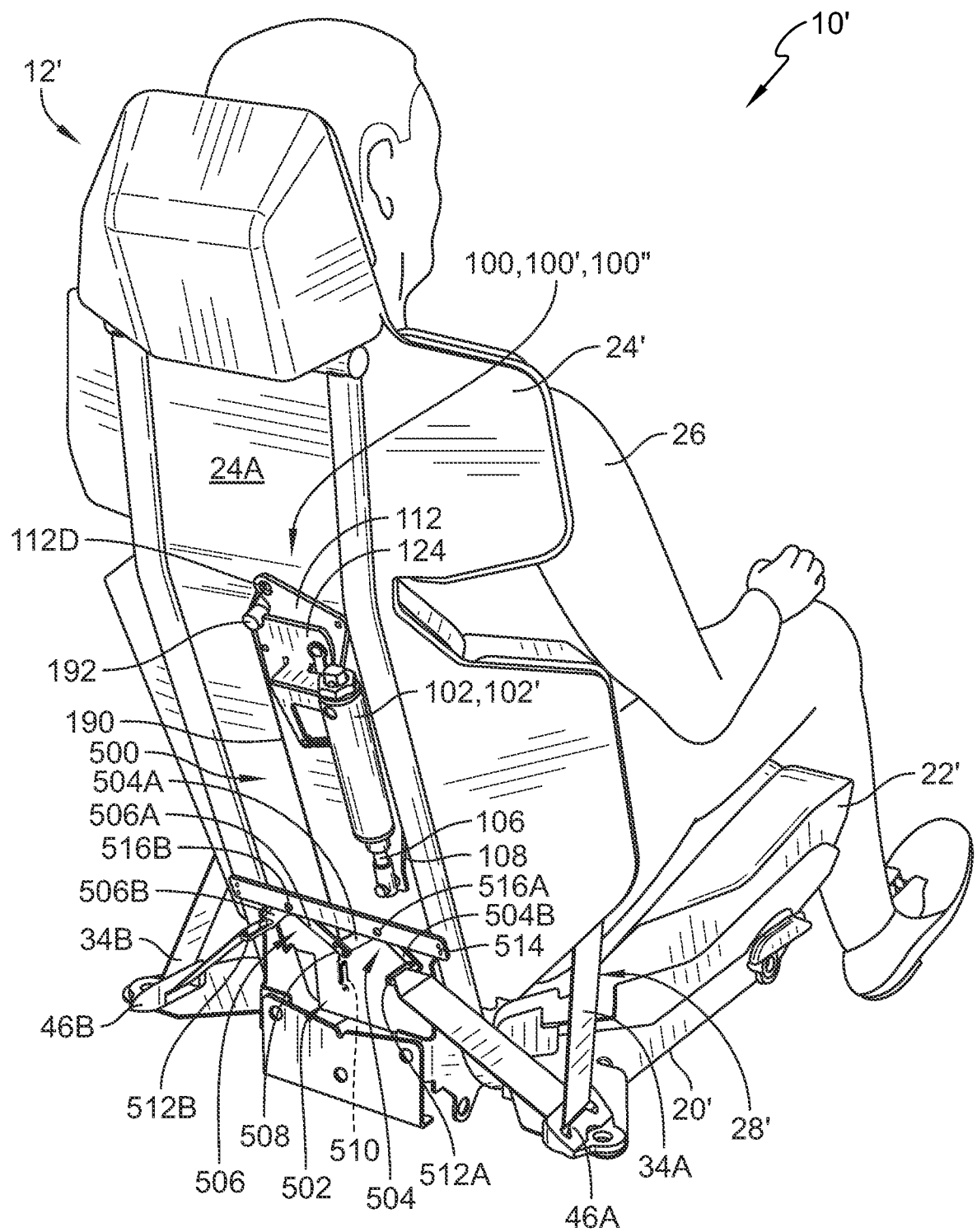
FIG. 11A is a rear perspective view another embodiment of an occupant seat restraint system including an occupant seat mounted in a motor vehicle, another embodiment of an occupant restraint system operatively coupled to the occupant seat and an embodiment of a restraint web tensioning apparatus operatively coupled to the occupant restraint system and shown in an unactuated or web non-tensioning state or position.
Figure 11B:
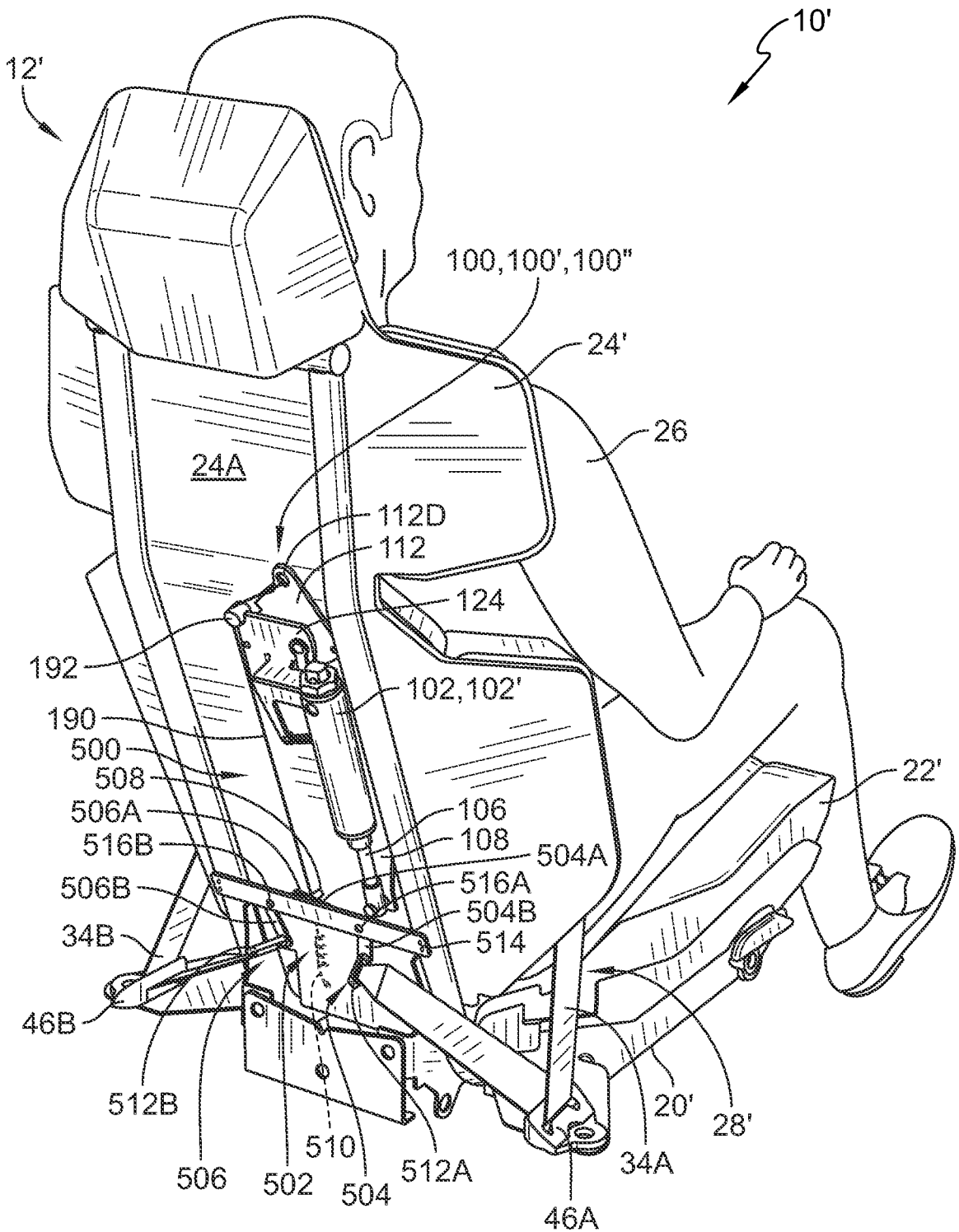
FIG. 11B is a rear perspective view similar to FIG. 11A with the restraint web tensioning apparatus shown in an actuated or web tensioning state or position.

Referring now to FIGS. 11A and 11B, another embodiment is shown of a motor vehicle occupant seat restraint system 10' including an occupant seat 12, another embodiment of an occupant restraint system 28' operatively coupled to the seat 12 and an embodiment of a restraint web tensioning apparatus 500 operatively coupled to the occupant restraint system 28'. It will be understood that the particular occupant seat 12' depicted in FIGS. 11A and 11B is shown only by way of example, and is not to be considered to be limiting in any way. The occupant seat 12', like the occupant seat 12, includes a seat bottom 22' coupled to a seat base 20' configured to be mounted to a floor 16 and/or frame of a motor vehicle, and a seat back 24' operatively coupled to the seat base 20' and/or seat bottom 22'. Another embodiment of an occupant restraint system 28' is operatively coupled to the occupant seat 12' which includes a pair of lap webs 34A, 34B extendable over and about a lap of the occupant 26 of the seat 12. Respective ends of the lap webs 34A, 34B at the front of the seat 12 may illustratively be fitted with conventional releasable engagement structures, e.g., tongue and respective buckle, for releasably coupling the lap webs 34A, 34B together about the lap of the occupant 26. Opposite ends of the lab webs 34A, 34B extend through respective, conventional web guides 46A, 46B mounted to the seat base 20' on and to opposite, respective sides of the seat 12', and are operatively coupled to a mechanical movement converter 502 of a restraint web tensioning apparatus 500 which will be described in detail below. Although the occupant restraint system 28' is illustrated in FIGS. 11A and 11B as including only two lap webs 34A, 34B, i.e., so as to form a two-point restraint system, it will be understood that the occupant restraint system 28' is not so limited and may contain one or more additional points of restraint. For example, which should not be considered to be limiting in an way, some alternate embodiments of the occupant restraint system 28' may include two shoulder webs each extendable over a respective shoulder of the occupant 26 so as to form a conventional 4-point restraint system, and other alternate embodiments of the occupant restraint system 28' may include two such shoulder webs and two thigh webs each extendable over a respective thigh of the occupant 26.

In the embodiment illustrated in FIGS. 11A-11B, an embodiment of the restraint web tensioning apparatus 500 includes one of the resettable web tensioning devices 100, 100', 100", as illustrated in FIGS. 1-10 and described above, operatively coupled to an embodiment of the mechanical movement converter 502, with each of the web tensioning device 100, 100', 100" and the mechanical movement converter 502 mounted, i.e., fixed, to the rear surface 24A (and/or one or more frame components) of the seat back 24' of the occupant seat 12'. It will be understood that whereas the restraint web tensioning apparatus 500 is illustrated in FIGS. 11A-11B as including one of the resettable web tensioning devices 100, 100', 100", the restraint web tensioning system 500 is not so limited, and in alternate embodiments the restraint web tensioning system 500 may include any conventional web tensioning device whether resettable or non-resettable and/or whether linearly, rotationally or otherwise actuated.

In the illustrated embodiment, the bracket 124 of the resettable web tensioning device 100, 100', 100" is mounted to the rear surface 24A (and/or to one or more frame components) of the seat back 24' with the device 100, 100', 100" oriented such that the elongated housing 102 extends approximately vertically along the rear surface 24A and the guide member 106 faces downwardly toward the seat base 20'. The linkage member 44 is illustratively omitted, and the opening 112D through the locking plate 112 through which the fixation element 116 would otherwise extend generally faces upwardly away from the seat base 20'. In the illustrated orientation of the device 100, 100', 100", the locking plate 112 illustratively rotates clockwise in a web tensioning mode from the unactuated or non-web tensioning state or position illustrated in FIG. 11A to the actuated or web tensioning state or position illustrated in FIG. 11B such that the opening 112D correspondingly rotates clockwise from an unactuated or non-web tensioning position illustrated in FIG. 11A to an actuated or web tensioning position illustrated in FIG. 11B, via movement of the locking arm 108 as described above. In a resetting mode, the locking plate 112 illustratively rotates counterclockwise actuated or web tensioning state or position illustrated in FIG. 11B to the unactuated or non-web tensioning state or position illustrated in FIG. 11A such that the opening 112D correspondingly rotates counterclockwise from the actuated or web tensioning position illustrated in FIG. 11B to the unactuated or non-web tensioning position illustrated in FIG. 11A, via movement of the locking arm 108 as also described above.

One end of a cord 190, e.g., in the form of a cable, wire, strap, web or tether, extends through the opening 112D and is attached, i.e., fixed, to the locking plate 112, and an opposite end extends downwardly along the rear surface 24A of the seat back 24' toward, and into operative engagement with, the mechanical movement converter 502, such that movement of the locking plate 112 is translated through the cord 190 to the mechanical movement converter 502. In the illustrated embodiment, a cable guide, e.g., post, 192 is affixed to the rear surface 24A (and/or to one or more frame components) of the seat back 24' adjacent to the locking plate 112, and the cord 190 bears against at least a portion of the post 192 so as to guide movement of the cord 190 toward and away from the mechanical movement converter 502. Illustratively, the post 192 is positioned such that the cord 190 extends substantially vertically along the rear surface 24A of the seat back 24' between the post 192 and the connection point of the cord 190 with the mechanical movement converter 502. Such positioning of the post 192 relative to the mechanical movement converter 502 illustratively translates rotary movement of the locking plate 112 just described to (vertical) linear movement relative to the mechanical movement converter 502. It will be understood that other orientations of the device 100, 100', 100" and/or of the post 192 along the rear surface 24A of the seat back 24' are contemplated, and that any orientation of the device 100, 100', 100" along and relative to the rear surface 24A of the seat back 24' is intended to fall within the scope of this disclosure.

The mechanical movement converter 502 is illustratively provided in the form of a single-input, dual-output device which converts the input rotary movement of the locking plate 112 (converted in the illustrated embodiment by the post 192 to linear movement) to two separate output movement paths which are generally opposite one another, wherein the output movement paths are coupled to respective ends of the lap webs 34A, 34B extending through the respective web guides 46A, 46B so as to simultaneously apply tension to, or release tension from, the lap webs 34A, 34B . In the embodiment illustrated in FIGS. 11A, 11B, the mechanical movement converter 502 includes a pair of angled actuator arms 504, 506 each having two arm segments 504A, 504B and 506A, 506B respectively, wherein the free ends of the arm segments 504A, 506A are pivotably coupled to one another via a post or pin 508 such that the respective ends of the actuator arm segments 504A, 506A each independently pivot about, and relative to, the post or pin 508. In the illustrated embodiment, the angled actuator arms 504, 506 are L-shaped so as to form a substantially right angle between the arm segments 504A, 504B and 506A, 506B of each, although in alternate embodiments the angled actuator arm segments 504A, 504B may form an acute or obtuse angle therebetween and/or the angled actuator arm segments 506A, 506B may form an acute or obtuse angle therebetween. In any case, the respective end of the cord 190 is attached, i.e., fixed, to the post or pin 508 such that the post or pin 508 is movable by the cord 190, e.g., vertically, relative to the seat back 24' toward and away from the seat base 20' between an unactuated or non-web tensioning position illustrated by example in FIG. 11A and an actuated or web tensioning position illustrated by example in FIG. 11 B. In some embodiments, as shown by dashed line representation in FIGS. 11A, 11B, a biasing member 510, e.g., a coil spring, may optionally be connected between the seat base 20' and the post or pin 508 to bias the post or pin 508 to the unactuated or non-web tensioning position illustrated in FIG. 11A. The biasing force of the biasing member 510, in embodiments which include it, is illustratively selected such that the force of actuation of the web tensioning device 100, 100', 100", translated to the post or pin 508 via the motion of the locking plate 112 and the cord 190 as illustrated by example in FIG. 11B, is sufficient to overcome the biasing force of the biasing member 510 so as to move the post or pin 508 from the unactuated position illustrated in FIG. 11A to the actuated position illustrated in FIG. 11B, and such that the biasing force of the biasing member 510 is sufficient to draw the post or pin 508 from the actuated position illustrated in FIG. 11B to the unactuated position illustrated in FIG. 11A upon deactuation (i.e., resetting) of the web tensioning device 100, 100', 100".

The free ends of the arm segments 504B, 506B define web mounting structures configured to affix the ends of the respective lap webs 34A, 34B thereto. In the illustrated embodiment, a web slot 512A is defined at the free end of the arm segment 504B, and the end of the lap web 34A extending through the web guide 46A and toward the rear of the seat back 24' is passed through the web slot 512A and then affixed to itself to secure the lap web 34A to the free end of the arm segment 504B of the actuator arm 504. Another web slot 512B is defined at the free end of the arm segment 506B, and the end of the lap web 34B extending through the web guide 46B and toward the rear of the seat back 24' is passed through the web slot 512B and then affixed to itself to secure the lap web 34B to the free end of the arm segment 506B of the actuator arm 506.

In alternate embodiments, the web slot 512A and/or the web slot 512B may be replaced with other conventional web securement structures for affixing the ends of the respective lap webs 34A, 34B to the free ends of the respective arm segments 504B, 506B. In other alternate embodiments, the free ends of the arm segments 504B, 506B may be fitted with, or configured to be fitted with, respective web retractors with the respective lap webs 34A, 34B operatively coupled thereto. Alternatively, web retractors may be mounted to the rear surface 24A of the seat back 24', to the seat base 20' and/or to the floor 16 and/or frame component(s) of the motor vehicle, with the respective lap webs 34A, 34B fed through the web slots 512A, 512B and then coupled to the respective web retractors, as depicted by example with the web retractor 50 of FIG. 1. In any case, such web retractors may be a conventional, e.g., in the form of automatic locking retractors (ALR) which automatically lock under one or more non-emergency conditions, or in the form of emergency locking retractors (ELR) which lock under one or more emergency conditions. In some embodiments, the such web retractors may be mechanically and/or electrically controlled and magnetically actuated locking web retractors of the type disclosed in U.S. patent application Ser. No. 17/002,016, filed Aug. 25, 2020, and in U.S. patent application Ser. No. 17/404,086, filed Aug. 17, 2021, the disclosures of which are both incorporated herein by reference in their entireties. In such embodiments, actuators may be operatively coupled to the web retractors, and may be electrically controllable to selectively lock the web retractors to thereby selectively prevent the web retractors from paying out the respective lap webs 34A, 34B and to selectively unlock the web retractors to thereby selectively allow the web retractors to take up and pay out the respective lap webs 34A, 34B. Examples of such retractors and actuators are illustrated in FIG. 1 as items 50 and 52, and are described hereinabove. In embodiments which include such web retractors and actuators, the web retractors may, along with the web tensioning device 100, 100', 100", be electronically controllable as described herein.

In still other alternate embodiments, the web tensioning device 100, 100', 100" and the mechanical movement converter 502 illustrated by example in FIGS. 11A, 11B may both be replaced with web retractors configured to selectively retract, i.e., take up, a predetermined or programmable amount of web, therein. Such web retractors may, for example, include or otherwise be operatively coupled to a respective electrically-controllable motor or other electrically controlled actuator responsive to a first control signal to rotate the respective web spool (to which a respective one of the lap webs 34A, 34B is attached) for a selected time period or for a selected number of spool rotations, to take up the predetermined or programmable amount of web thereon to thereby apply tension to the respective lap webs 34A, 34B as described herein, and responsive to a second control signal to rotate the respective web spool for a selected time period or for a selected number of spool rotations, to pay out the predetermined or programmable amount of web therefrom to thereby release the tension applied to the respective lap webs 34A, 34B and thereby reset the web retractors, as also described herein. Such web retractors may be mounted to the seat back 24', seat base 20' and/or to the floor 16 or one or more frame components of the motor vehicle. In some embodiments in which the occupant restraint system 28 is a conventional three-point restraint system as illustrated by example in FIG. 1, only one such retractor may be implemented. In some embodiments in which the occupant restraint system 28' is a two or more point restraint system, two such web retractors may be coupled to the respective ends of the lap webs 34A, 34B. In some embodiments in which the occupant restraint system 28' is a conventional four point restraint system, i.e., with two lap webs 34A, 34B and two shoulder webs, or a conventional six-point restraint system, i.e., with two lap webs 34A, 34B, two shoulder webs and two thigh webs, four such web retractors may be implemented; with one operatively coupled to each of the two lap webs, and to each of the two shoulder webs or each of the thigh webs. In some embodiments in which the occupant restraint system 28' is a conventional 6-point restraint system, six such retractors may be implemented; with one operatively coupled to each of the two lap webs, each of the two shoulder webs and each of the two thigh webs. In some embodiments in which the occupant restraint system 28' is a two or more point restraint system, only one such retractor may be implemented in combination with at least one of the mechanical movement converters 502 or equivalents thereof, for applying/releasing tension to/from at least two of the two or more occupant restraint webs.

Referring again to FIGS. 11A and 11B, the corner of the actuator arm 504, i.e., the junction of the arm segments 504A, 504B, is pivotably coupled via a post or pin 516A to an elongated bracket 514 that is attached, i.e., fixed, to the rear surface (or one or more frame components) of the seat back 24', and the corner of the actuator arm 506, i.e., the junction of the arm segments 506A, 506B, is pivotably coupled to the bracket 514 via another post or pin 516A. The elongated bracket 514 illustratively extends laterally across the rear surface 24A of the seat back 24' between the seat base 20' and the web tensioning device 100, 100', 100", and the actuator arms 504, 506 are spaced apart from one another and pivotably mounted to the bracket 514 such that each actuator arm is pivotable about the respective post or pin 516A, 516B in clockwise and counterclockwise directions as depicted by example in FIGS. 11A and 11B. In alternate embodiments, the mechanical movement converter 502 may be mounted, i.e., affixed or attached, to the floor 16 and/or one or more frame components of the motor vehicle.

FIG. 11A represents the unactuated or non-web tensioning state or position of the restraint web tensioning apparatus 500, the resettable web tensioning device 100, 100', 100" and the mechanical movement converter 502. In this position, the locking plate 112 of the device 100, 100', 100" is rotated fully counterclockwise, the actuator arm 504 is rotated fully counterclockwise and the actuator arm 506 is rotated fully clockwise, such that minimum tension is applied to the lap webs 34A, 34B and the lap webs 34A, 34B have their longest lengths. Upon actuation of the resettable web tensioning device 100, 100', 100" as described hereinabove, the locking plate 112 is rotated by operation of the device 100, 100', 100" in the clockwise direction which displaces the cord 190 upwardly as depicted in FIG. 11B. This, in turn, causes the actuator arm 504 to rotate in the clockwise direction and the actuator arm 506 to rotate in the counterclockwise direction to apply tension to the respective lap webs 34A, 34B, and in the fully clockwise position of the actuator arm 504 and the fully counterclockwise position of the actuator arm 506 illustrated in FIG. 11B the lap webs 34A, 34B have their shortest lengths. Upon resetting of the web tensioning device 100, 100', 100" as described above, the actuator arms 504, 506 return to their positions illustrated in FIG. 11A to release the tension on the lap webs 34A, 34B.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, as described above, in alternate embodiments the web tensioning device 100, 100', 100" in any of the illustrated embodiments may alternatively be mounted, or configured to be mounted, to the seat back, the seat base, the floor and/or one or more frame components of the motor vehicle. As another example, in embodiments which include a mechanical movement converter, such a mechanical movement converter may alternatively be mounted to the seat base, the floor and/or one or more frame components of the motor vehicle. As a further example, the web tensioning device 100, 100', 100" may, in alternative embodiments, be replaced with at least one web retractor configured to apply/release tension to one or more occupant restraint webs. As still a further example, the web tensioning device 100, 100', 100" and the mechanical movement converter 502 may both be replaced with two or more web retractors configured to apply/release tension to two or more occupant restraint webs.

What is claimed is:

1. An apparatus for tensioning an occupant restraint harness coupled to an occupant seat mountable in a motor vehicle, the occupant restraint harness including first and second lap webs securable about an occupant of the seat, the apparatus comprising:
   a web tensioning device configured to be attached to a rear side of the occupant seat, the web tensioning device having an actuated state and an unactuated state, and
   a mechanical movement converter configured to be attached to the rear side of the occupant seat and having an input operatively coupled to the web tensioning device, a first output coupled to the first lap web and a second output coupled to the second lap web, the mechanical movement converter responsive to a transition of the web tensioning device from the unactuated state to the actuated state to simultaneously apply tension to the first and second lap webs,
   wherein the web tensioning device is resettable from the actuated state to the unactuated state,
   and wherein the mechanical movement converter is responsive to a transition of the web tensioning device from the actuated state to the unactuated state to simultaneously release the tension applied to the first and second lap webs.

2. The apparatus of claim 1, wherein the mechanical movement converter includes first and second actuator arms with one end of the first actuator arm pivotably coupled to one end of the second actuator arm via a first pin, and with opposite ends of the first and second actuator arms attached to the first and second web respectively, and wherein the first pin is the input of the mechanical movement converter, the opposite end of the first actuator arm is the first output of the mechanical movement converter and the opposite end of the second actuator arm is the second output of the mechanical movement converter, and wherein the web tensioning device acts on the first pin with the transition from the unactuated state to the actuated state thereof to cause the first and second actuator arms to simultaneously move in a direction which applies the tension to the first and second lap webs.

3. The apparatus of claim 2, wherein the mechanical movement converter further includes a bracket configured to be mounted to the rear side of the occupant seat, and wherein the first actuator arm is pivotably mounted between the one end and the opposite end thereof to the bracket via a second pin, and the second actuator arm is pivotably mounted between the one end and the opposite end thereof to the bracket via a third pin.

4. The apparatus of claim 2, wherein the web tensioning device includes a piston assembly having a piston which moves from a first position to a second position to cause the transition of the web tensioning device from the unactuated state to the actuated state, and wherein the first pin is operatively coupled to the piston assembly.

5. The apparatus of claim 4, wherein one end of the piston assembly is coupled to one end of a guide rod, the guide rod having an opposite end operatively coupled to the first pin.

6. The apparatus of claim 4, further comprising an actuator responsive to a first control signal to cause the piston to move from the first position to the second position to cause the mechanical movement converter to apply the tension to the first and second lap webs, and responsive to a second control signal to reset the piston of the piston assembly from the second position to the first position to cause the mechanical movement converter to release the tension on the first and second lap webs.

7. The apparatus of claim 4, wherein the web tensioning device further includes an elongated housing configured to be secured to the rear side of the occupant seat, and wherein the piston of the piston assembly is axially movable within and along an elongated chamber defined within the elongated housing between the first and second positions thereof.

8. The apparatus of claim 6, wherein the web tensioning device further includes an elongated housing configured to be secured to the rear side of the occupant seat, and wherein the piston of the piston assembly is axially movable within and along an elongated chamber defined within the elongated housing between the first and second positions thereof, and wherein the actuator includes an electronically controllable valve having a gas inlet coupled to a gas outlet of a gas reservoir and a gas outlet in fluid communication with the elongated chamber, and wherein the valve is responsive to the second control signal to selectively direct the pressurized gas in the gas reservoir into the elongated chamber to position the piston of the piston assembly in the first position thereof by forcing the piston of the piston assembly to move axially within and along the elongated chamber to the first position of the piston within the elongated chamber.

9. The apparatus of claim 8, wherein the valve further includes a vent, and wherein, with the piston of the piston assembly in the first position thereof within the elongated chamber, the valve is responsive to the first control signal to direct pressurized gas in the elongated chamber through the vent to thereby allow a biasing member to move the piston of the piston assembly axially within and along the elongated chamber, under the bias of the biasing member, from the first position to the second position within the elongated chamber.

10. The apparatus of claim 9, wherein, with the piston of the piston assembly in the first position thereof within the elongated chamber, the valve is responsive to the second control signal to selectively direct the pressurized gas in the gas reservoir into the elongated chamber to reset the piston of the piston assembly in the first position thereof by forcing the piston of the piston assembly to move axially within and along the elongated chamber, against the bias of the biasing member, from the second position of the piston back to the first position of the piston within the elongated chamber.

11. The apparatus of claim 6, wherein the actuator includes a gas reservoir containing pressurized gas, and an electronically controllable valve having a gas inlet coupled to a gas outlet of the gas reservoir, a gas outlet in fluid communication with the elongated chamber and a vent, and wherein the valve is responsive to the second control signal to selectively direct any pressurized gas in the elongated chamber through the vent to thereby allow the biasing member to move the piston assembly axially within and along the elongated chamber, under the bias of the biasing member, to the unactuated position of the piston assembly within the elongated chamber.

12. The apparatus of claim 6, wherein the web tensioning device further includes an elongated housing configured to be secured to the rear side of the occupant seat, and wherein the piston of the piston assembly is axially movable within and along an elongated chamber defined within the elongated housing between the first and second positions thereof, and wherein the actuator includes an electronically controllable valve having a gas inlet coupled to a gas outlet of a gas reservoir and a gas outlet in fluid communication with the elongated chamber, and wherein, with the piston of the piston assembly in the first position, the valve is responsive to the first control signal to selectively direct the pressurized gas in the gas reservoir into the elongated chamber to force the piston of the piston assembly to move axially within and along the elongated chamber from the first position of the piston to the second position of the piston within the elongated chamber.

13. The apparatus of claim 12, wherein, with the piston of the piston assembly in the second position thereof, the valve is responsive to the second control signal to selectively direct the pressurized gas in the elongated chamber through a vent to reset the piston of the piston assembly in the first position thereof by allowing a biasing member to move the piston of the piston assembly axially within and along the elongated chamber, under the bias of the biasing member, from the second position of the piston back to the first position of the piston within the elongated chamber.

14. The apparatus of claim 6, wherein the web tensioning device further includes an elongated housing configured to be secured to the rear side of the occupant seat, and wherein the piston of the piston assembly is axially movable within and along an elongated chamber defined within the elongated housing between the first and second positions thereof, and wherein the piston assembly further includes a bracket fixedly mounted within the elongated chamber opposite the piston, and a first biasing member coupled to and between the piston and the bracket, the first biasing member configured to bias the piston of the piston assembly axially along the elongated chamber away from the bracket.

15. The apparatus of claim 14, wherein the bracket defines at least one opening therethrough and the piston defines at least one channel therein, and wherein, in the first position of the piston of the piston assembly within the elongated channel, the at least one opening defined through the bracket and the at least one channel defined in the piston are aligned with one another, and further comprising at least one detent configured to pass into the at least one opening and into the at least one channel to secure the piston to the bracket in the first position of the piston of the piston assembly within the elongated channel.

16. The apparatus of claim 15, wherein the actuator includes an electromagnet spaced apart from the bracket opposite the piston, a ferromagnetic member positioned between the electromagnet and the bracket and axially movable therebetween and a second biasing member coupled to and between the electromagnet and the ferromagnetic member, the second biasing member configured to bias the piston of the piston assembly axially along the elongated chamber away from the electromagnet.

17. The apparatus of claim 16, wherein the electromagnet is responsive to the second control signal to not produce a magnetic field such that the second biasing member forces the ferromagnetic member to move axially toward the bracket to trap the at least one detent in the at least one opening and the at least one channel to secure the piston to the bracket in the first position of the piston of the piston assembly within the elongated channel.

18. The apparatus of claim 17, wherein the at least one detent is biased radially away from the piston, and wherein, with the piston of the piston assembly in the first position thereof, the electromagnet is responsive to the first control signal to produce the magnetic field to draw the ferromagnetic member, against the bias of the second biasing member, toward the electromagnet and away from the bracket so as to clear the at least one detent such that the at least one detent moves, under bias, radially away from the piston to thereby allow the first biasing member to move the piston of the piston assembly axially within and along the elongated chamber, under the bias of the first biasing member, from the first position of the piston to the second position of the piston within the elongated chamber.

19. The apparatus of claim 1, wherein the restraint harness is one of a two-point, four-point or six-point restraint harness.

* * * * *